US009090238B2

(12) United States Patent  (10) Patent No.: US 9,090,238 B2
Kakihara  (45) Date of Patent: Jul. 28, 2015

(54) APPARATUS FOR DIAGNOSING ELEMENT TEMPERATURE SENSOR

(71) Applicant: DENSO CORPORATION, Kariya, Aichi-pref. (JP)

(72) Inventor: Takayuki Kakihara, Okazaki (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/289,843

(22) Filed: May 29, 2014

(65) Prior Publication Data

US 2014/0358391 A1   Dec. 4, 2014

(30) Foreign Application Priority Data

May 30, 2013   (JP) ................................. 2013-114362

(51) Int. Cl.

| | |
|---|---|
| B60T 17/22 | (2006.01) |
| G01K 15/00 | (2006.01) |
| B60T 7/04 | (2006.01) |
| B60T 7/12 | (2006.01) |
| B60T 13/66 | (2006.01) |

(52) U.S. Cl.
CPC . *B60T 17/22* (2013.01); *B60T 7/04* (2013.01); *B60T 7/122* (2013.01); *B60T 13/662* (2013.01); *G01K 15/007* (2013.01)

(58) Field of Classification Search
CPC ...... G01K 15/007; B60T 17/22; B60T 13/662; B60T 7/042; B60T 7/122
USPC ................ 701/22, 29.7, 29.8, 30.3, 30.5, 30.9
See application file for complete search history.

(56) References Cited

FOREIGN PATENT DOCUMENTS

JP   2012-170211   9/2012

*Primary Examiner* — Thomas Tarcza
*Assistant Examiner* — Kevin Myhre
(74) *Attorney, Agent, or Firm* — Nixon & Vanderhye, P.C.

(57) ABSTRACT

An apparatus for diagnosing a temperature detection unit, mounted in a vehicle having a power conversion circuit including a switching element, a control unit configured to operate the switching element to control a torque of a main rotating machine electrically connected to the power conversion circuit to a demanded torque. The temperature detection unit is configured to detect a temperature of the switching element. In the apparatus, a current supply increasing unit is configured to operate the switching element to increase a current supply to the switching element. A permission unit permits the current supply increasing unit to increase the current supply only when a braking torque is being applied to the vehicle. A diagnostic unit determines that an abnormality is present in the temperature detection unit when it is determined that the detection temperature of the temperature detection unit is out of an acceptable range.

18 Claims, 18 Drawing Sheets

FIG.5
| ΔT | SMALL ←――――→ LARGE |
|---|---|
| INITIAL TEMPERATURE (Ta, Tc) | HIGH ←――――→ LOW |
| ΔI | SMALL ←――――→ LARGE |
| Gc | HIGH ←――――→ LOW |
| Vs | HIGH ←――――→ LOW |
| Tair | HIGH ←――――→ LOW |
FIG.6A  IGBT HEAT CAPACITY: SMALL, SENSOR SENSITIVITY: HIGH
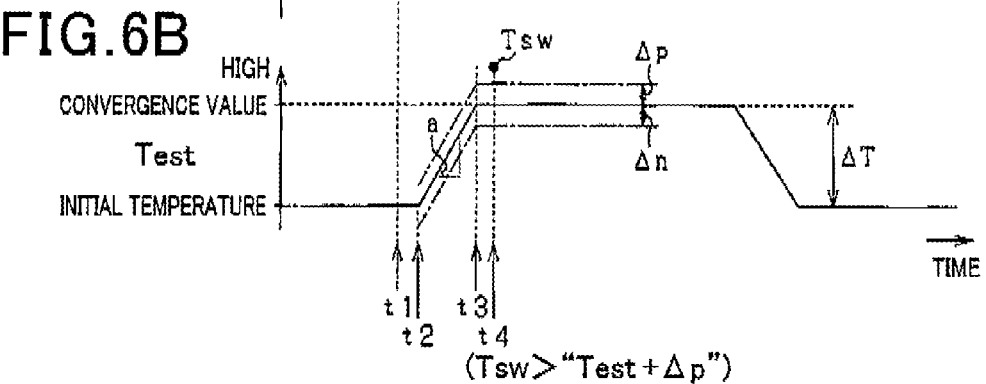
FIG.6B
$(Tsw > "Test + \Delta p")$ FIG.12A   IGBT HEAT CAPACITY: LARGE, SENSOR SENSITIVITY: LOW
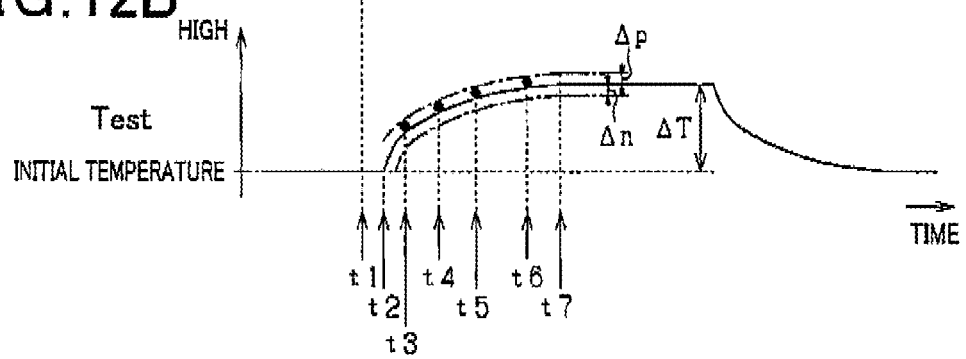
FIG.13
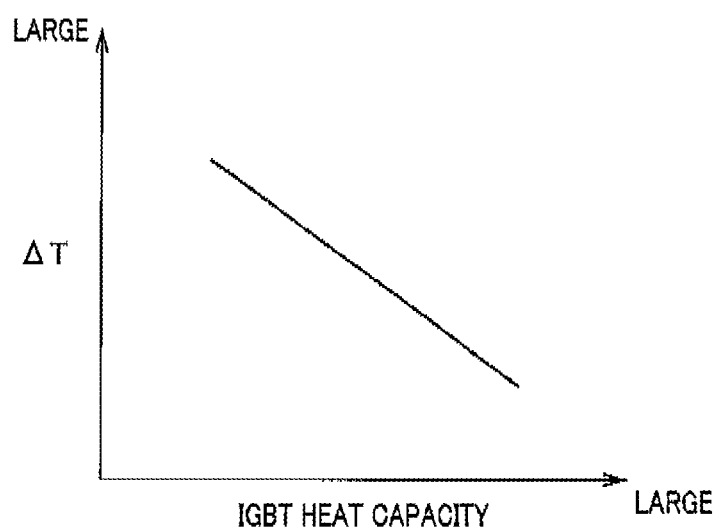

APPARATUS FOR DIAGNOSING ELEMENT TEMPERATURE SENSOR

CROSS-REFERENCE TO RELATED APPLICATION

This application is based on and claims the benefit of priority from earlier Japanese Patent Application No. 2013-114362 filed May 30, 2013, the description of which is incorporated herein by reference.

BACKGROUND

1. Technical Field

The present invention relates to an apparatus for diagnosing a temperature detection unit, mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element.

2. Related Art

An apparatus for diagnosing a temperature detection unit, as disclosed in Japanese Patent Application Laid-Open Publication No. 2012-170211, is mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element. The apparatus estimates, on the basis of a current flowing through the switching element, a difference between a temperature of the switching element and a temperature reference value as a temperature change estimate, and calculates a difference between a detection value from the temperature detection unit and the temperature reference value as a temperature change measurement. The apparatus determines the presence of an abnormality in the temperature detection unit on the basis of a difference between the temperature change estimate and the temperature change measurement.

With the disclosed apparatus, however, a current may be supplied to the switching element for diagnosing the temperature detection unit regardless of a vehicle user's demand. Power is thereby supplied to the rotating machine as a prime mover from the power conversion circuit, which causes the rotating machine to output a torque. This may reduce drivability, thereby causing discomfort for the vehicle user or the like.

In consideration of the foregoing, it would therefore be desirable to have an apparatus for diagnosing the temperature detection unit without reducing drivability.

SUMMARY

In accordance with an exemplary embodiment of the present invention, there is provided an apparatus for diagnosing a temperature detection unit, mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element. The apparatus includes: a current supply increasing unit configured to operate the switching element to increase a current supply to the switching element; an estimation unit configured to estimate a detection temperature of the temperature detection unit when the current supply to the switching element is increased by the current supply increasing unit under an assumption that temperature detection unit is operating normally; a range calculation unit configured to calculate an acceptable range of the estimate of the detection temperature defined by an upper limit side threshold higher than the estimated detection temperature by a first predefined value and a lower limit side threshold lower than the estimated detection temperature by a second predefined value; a diagnostic unit configured to, when it is determined that the detection temperature of the temperature detection unit is out of the acceptable range of the estimate of the detection temperature at a time the detection temperature is estimated by the estimation unit, determine that an abnormality is present in the temperature detection unit; and a permission unit configured to permit the current supply increasing unit to increase the current supply only when a braking torque is being applied to the vehicle by a braking unit.

In the above embodiment, only when the braking torque is being applied to the vehicle, the increasing of current supply to the switching element is permitted. Under such a condition, even when a torque is outputted from the rotating machine during increasing of current supply to the switching element for diagnosing the temperature detection unit, deviation of a vehicle's behavior from a user's intended behavior, caused by the output torque of the rotating machine, can be avoided. This allows the temperature detection unit to be diagnosed without decreasing drivability.

In addition, the current supply to the switching element is increased when the braking torque is applied to the vehicle. The amount of current supply increase can thereby be set great enough to allow the presence of an abnormality in the temperature detection unit to be determined and to allow the amount of current supply increase for diagnosing the temperature detection unit to be stabilized. This leads to enhancement of the accuracy of diagnosing the temperature detection unit.

In accordance with another exemplary embodiment of the present invention, there is provided an apparatus for diagnosing a temperature detection unit, mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element. The apparatus includes: a current supply increasing unit configured to operate the switching element to increase a current supply to the switching element; a estimation unit configured to estimate a detection temperature of the temperature detection unit when the current supply to the switching element is increased by the current supply increasing unit under an assumption that temperature detection unit is operating normally; a range calculation unit configured to calculate an acceptable range of the estimate of the detection temperature defined by an upper limit side threshold higher than the estimated detection temperature by a first predefined value and a lower limit side threshold lower than the estimated detection temperature by a second predefined value; a diagnostic unit configured to, when it is determined that the detection temperature of the temperature detection unit is out of the acceptable range of the estimate of the detection temperature at a time the detection temperature is estimated by the estimation unit, determine that an abnormality is present in the temperature detection unit; and a direction unit configured to direct the current supply increasing unit to steer a d-axis current in the fixed coordinate system of the rotating machine such that the increasing of the current supply to the switching element by the current supply increasing unit does not result in a changing of the demanded torque.

In the above embodiment, the increasing of the current supply does not result in a changing of the demanded torque. Deviation of a vehicle's behavior from a user's intended behavior can thus be avoided. This allows the temperature detection unit to be diagnosed without decreasing drivability.

In addition, the current supply is increased such that the increasing of the current supply does not result in a changing of the demanded torque, which allows the current supply to be increased for the diagnostics on the temperature detection unit during normal traveling of the vehicle. This can advantageously increase opportunities for diagnosing the temperature detection unit.

BRIEF DESCRIPTION OF THE DRAWINGS

In the accompanying drawings:

FIG. 5 is an example of correcting an amount of temperature increase of the first embodiment;

FIGS. 6A and 6B are an example of timing chart for the diagnostics process of the first embodiment;

FIGS. 12A and 12B are an example of timing chart for the diagnostics process of the second embodiment;

FIG. 13 is an example of relationship between a heat capacity of an IGBT and an amount of temperature increase;

DESCRIPTION OF THE PREFERRED EMBODIMENTS

First Embodiment

There will now be explained a diagnosis apparatus for use with a parallel hybrid vehicle in accordance with a first embodiment of the present invention with reference to the accompanying drawings.

Figure 1A:
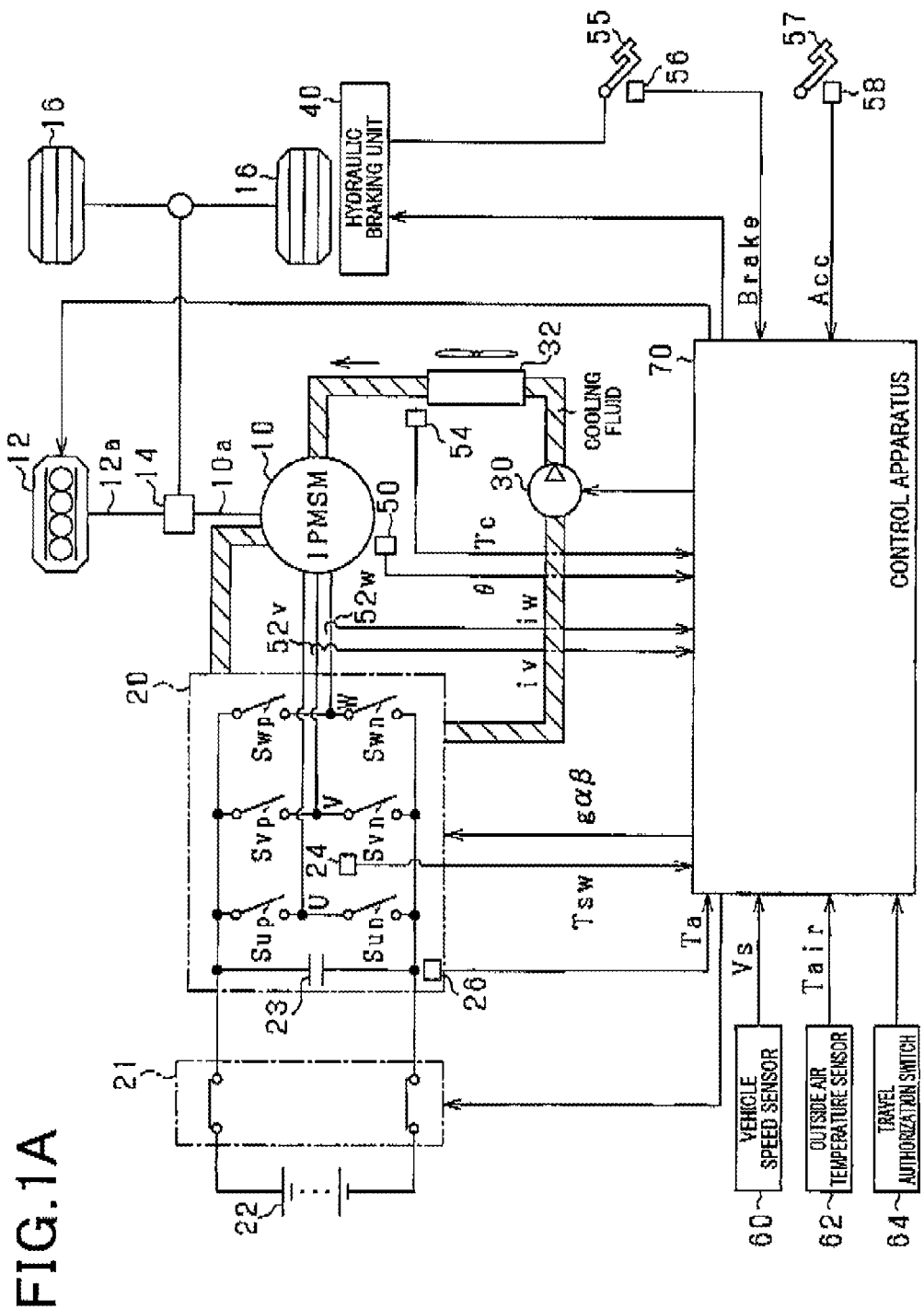
FIG. 1A is a block diagram of a vehicle control system in accordance with a first embodiment of the present invention.

As shown in FIG. 1A, the vehicle includes, as vehicle prime movers, a motor generator 10 (as a main rotating machine) and an engine 12. The motor generator 10 is a three-phase electrical motor and generator. A rotary shaft 10a of the motor generator 10 and a crankshaft 12a of the engine 12 are connected to drive wheels 16 via a power dividing mechanism 14 (e.g., a planetary gear train). In the present embodiment, an interior permanent magnet synchronous motor (IPMSM) is used as a motor generator 10.

The motor generator 10 is electrically connected to a high-voltage battery 22 through an inverter 20 and a main relay 21 as a power conversion circuit. The high-voltage battery 22 is a secondary battery having a terminal voltage of 100V or more (e.g., 288V), such as a lithium-ion secondary battery, a nickel-metal-hydride secondary battery or the like.

The main relay 21 is operable to be energized or de-energized to electrically connect or disconnect the high-voltage battery 22 and the inverter 20.

The inverter 20 includes three series connections of switching elements: a first series connection of high-side and low-side switching elements Sup, Sun, a second series connection of high-side and low-side switching elements Svp, Svn, and a third series connection of high-side and low-side switching elements Swp, Swn. A junction of the first series connection of high-side and low-side switching elements Sup, Sun is electrically connected to a U-phase terminal of motor generator 10, a junction of the second series connection of high-side and low-side switching elements Svp, Svn is electrically connected to a V-phase terminal of motor generator 10, and a junction of the third series connection of high-side and low-side switching elements Swp, Swn is electrically connected to a W-phase terminal of motor generator 10. In the present embodiment, each of the switching elements Sαβ (α=u, v, w, β=p, n) is a voltage-controlled semiconductor switching element, more specifically, an insulated gate bipolar transistor (IGBT), and is electrically connected in anti-parallel with a respectively corresponding freewheel diode (not shown). A smoothing capacitor 23 that smoothes an input voltage of the inverter 20 is electrically connected between the main relay 21 and the inverter 20.

For each of the switching elements Sαβ of the inverter 20, an element temperature sensor 24 (as a temperature detection unit) is provided in proximity to its corresponding switching element Sαβ of the inverter 20 to detect a temperature thereof directly. Each element temperature sensor 24 may include, but is not limited to, a temperature-sensitive diode or a thermistor or the like. Only one of the switching elements Sαβ is shown in FIG. 1A.

The vehicle includes another temperature sensor for directly detecting a temperature of a member other than the switching elements Sαβ. In the present embodiment, an invertor temperature sensor 26 is provided, as such a temperature sensor, in the inverter 20. A detection temperature at the invertor temperature sensor 26 is assumed to be correlated positively with each of the temperatures of the respective switching elements Sαβ. Particularly, in the present embodiment, the invertor temperature sensor 26 is assumed to be capable of detecting an ambient temperature to the switching element Sαβ.

The motor generator 10 and the inverter 20 are configured to be cooled by a cooling fluid (indicated by hatched lines) flowing through a cooling arrangement. More specifically, the cooling arrangement includes a motor-driven pump 30 and a radiator 32 driving a pump 30 allows the cooling fluid to circulate in a path going through the radiator 32, the motor generator 10 and the inverter 20 in this order, thereby cooling the motor generator 10 and the inverter 20.

Figure 1B:
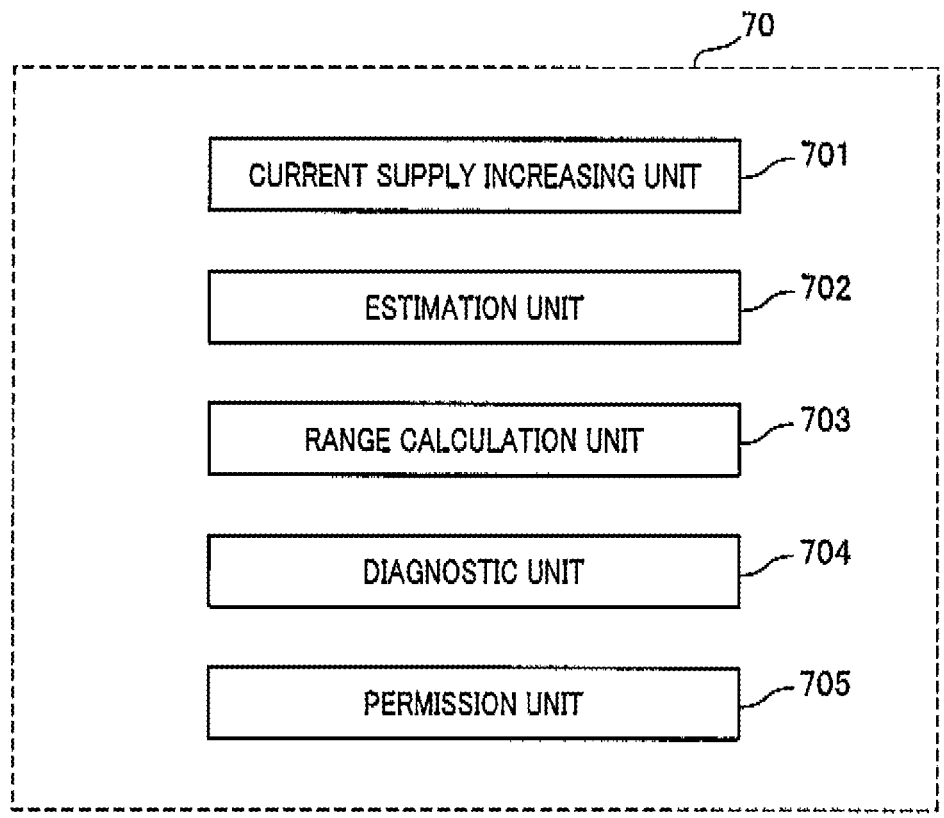
FIG. 1B is a block diagram of a control apparatus shown in FIG. 1A.
Figure 1C:
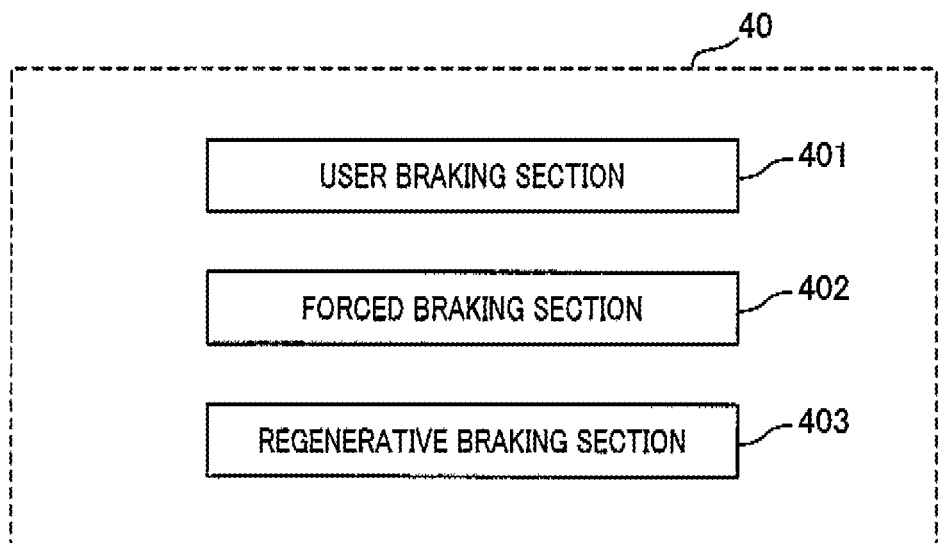
FIG. 1C is a block diagram of a braking unit shown in FIG. 1A.

The subject vehicle further includes an electronically-controlled braking unit 40 configured to apply a braking torque to wheels including a driven wheel 16. In the present embodiment, the braking unit 40 may be of hydraulic type and may be configured such that the braking torque applied to the driven wheel 16 increases with an increasing actuation (or depression) amount of a brake pedal (as a brake actuating element) 55 by a vehicle user. More specifically, as shown in FIG. 1C, the braking unit 40 includes a user braking section 401 configured to increase the braking torque with an increasing actuation amount of a brake pedal 55 by a user of the vehicle.

The subject vehicle includes various sensors for detecting states of vehicle mounted devices, including a rotation angle sensor 50 configured to detect a rotation angle (electric angle θ) of the motor generator 10, V-phase and W-phase current sensors 52v, 52w configured to detect V-phase and W-phase currents of the motor generator 10, respectively, and others. The rotation angle sensor 50 may include, but is not limited to, a resolver. Each of the current sensors 52v, 52w may include, but is not limited to, a current transformer or a resistor or the like.

The subject vehicle further includes a fluid temperature sensor 54 configured to detect a temperature of the cooling fluid, a brake sensor 5 configured to detect the actuation amount of the brake pedal 55 by the user, an accelerator sensor 58 configured to detect an actuation amount of the accelerator pedal 57 by the user, a vehicle-speed sensor 60 configured to detect a traveling speed of the subject vehicle, and an outside air temperature sensor 62 configured to detect an outside air temperature of surroundings of the subject vehicle.

The motor generator 10, the engine 12, the main relay 21, the pump 30 and the braking unit 40 are controlled by the control apparatus 70. The control apparatus 70 includes a central processing unit (CPU) and a memory storing computer programs to be executed in the CPU to perform various control processing as described later. The control apparatus 70 receives detection values from the various sensors and an output signal from a travel authorization switch 64. The travel authorization switch 64 is turned on by the user to direct the control apparatus to activate the vehicle controls and turned off by the user to direct the control apparatus to deactivate the vehicle controls. The travel authorization switch 64 may be an on-board switch, such as a push button type starting switch, or a user's portable device.

When the travel authorization switch 64 is turned on, the control apparatus 70 turns on the main relay 21, which allows the high-voltage battery 22 and the inverter 20 to be electrically connected to each other. Meanwhile when the travel authorization switch 64 is turned off, the control apparatus 70 turns off the main relay 21, which allows the high-voltage battery 22 and the inverter 20 to be electrically disconnected.

Various processing performed in the control apparatus 70 will now be explained in detail. In practice, processing may be performed, in its dedicated control apparatus or may be performed in more than one control apparatuses in a cooperative manner. For illustrative purpose, in the present embodiment, these control apparatuses are shown as a single control apparatus 70.

<Control Processing for Motor Generator 10 and Engine 12>

In this control processing, the motor generator 10 and the engine 12 are controlled so that a sum output torque of the motor generator 10 and the engine 12 can provide a vehicle demanded torque. More specifically, the vehicle demanded torque is calculated on the basis of an accelerator actuation amount Acc detected by the accelerator sensor 58, where the vehicle demanded torque is increased with an increasing accelerator actuation amount Acc. The calculated vehicle demanded torque is allocated between a demanded torque of the motor generator 10 (hereinafter referred to as a motor demanded torque) and a demanded torque of the engine 12 (hereinafter referred to as an engine demanded torque) so that a sum torque of the motor generator 10 and the engine 12 becomes the calculated vehicle demanded torque. The invertor 20 is operated so as to control an actual torque of the motor generator 10 to the motor demanded torque, and the engine 12 is operated so as to control an actual torque of the engine 12 to the engine demanded torque.

Figure 2:
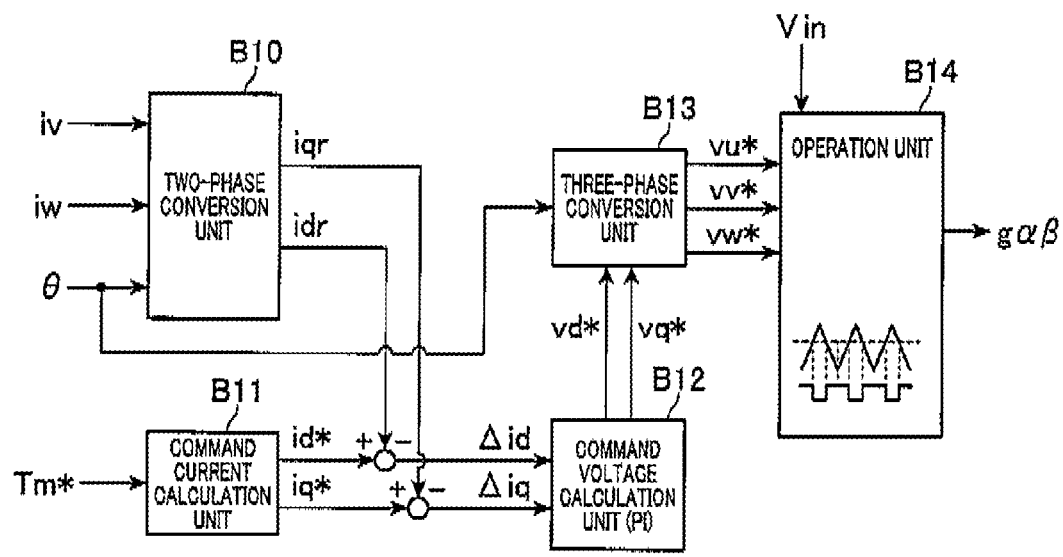
FIG. 2 is a block diagram of a field-oriented control loop of the first embodiment.

In control processing for the motor generator 10, the switching elements Sαβ are operated so that a current flowing through the motor generator 10 becomes equal to a command current for achieving the motor demanded torque. That is, in the present embodiment, an output torque of the motor generator 10 is controlled to the motor demanded torque by controlling the current flowing through the motor generator 10 to the demand current. Particularly, in the present embodiment, a field-oriented control loop is implemented so as to control the current flowing through the motor generator 10 to the demand current. The field-oriented control loop will now be explained with reference to FIG. 2.

A two-phase conversion unit B10 converts a U-phase current iu, a V-phase current iv and a W-phase current iw into a d-axis current idr and a q-axis current iqr that are currents in a rotating coordinate system on the basis of a detection value iv of a V-phase current sensor 52v and a detection value iw of a W-phase current sensor 52w and a detection value θ of a rotation angle sensor 50. It should be noted that the U-phase current iu can be calculated on the basis of the detection value iv of the V-phase current sensor 52v and the detection value iw of the W-phase current sensor 52w according to the Kirchhoff's laws.

A command current calculation unit B11 calculates a d-axis command current id* and a q-axis command current iq* that current command values in the rotating coordinate system on the basis of the motor demanded torque Tm*.

A command voltage calculation unit B12 calculates a d-axis command voltage vd* and a q-axis command voltage vq* as manipulated variables to feedback control the d-axis current idr and the q-axis current iqr to the d-axis command current id* and the q-axis command current iq*, respectively. More specifically, the d-axis command voltage vd* is calculated by proportional-integral (PI) control on the basis of a deviation Δid between the d-axis current idr and the d-axis command current id*, and the q-axis command voltage vq* is also calculated by proportional-integral (PI) control on the basis of a deviation Δiq between the q-axis current iqr and the q-axis command current iq*.

A three-phase conversion unit B13 converts the d-axis command voltage vd* and the q-axis command voltage vq* into three-phase command voltages vα* (α=u, v, w) in a stationary coordinate system of the motor generator 10 on the basis of the detection value θ of the rotation angle sensor 50.

These command voltages vα* are manipulated variables to feedback control the d-axis current idr and the q-axis current iqr into the d-axis command current id* and the q-axis command current iq*, respectively.

An operation unit B14 generates operation signals gαp to simulate the command voltages vα* (α=u, v, w) as three-phase output voltages of the inverter 20. In the present embodiment, operation unit B14 generates the operation signals gαβ by sinusoidal pulse-width modulation (PWM) processing on the basis of comparison of whether the command voltages vα* (α=u, v, w) normalized by an input voltage Vin of the inverter 20, i.e., vα*/Vin, are above or below a carrier, such as a triangular waveform signal. The operation unit 914 feeds the generated operation signals gαβ1 to the respective switching elements Sαβ. This allows sinusoid voltages that are 120 degrees out of phase to be respectively applied to the U-, V-, and W-phase windings of the motor generator 10, which leads to sinusoidal currents that are 120 degrees out of phase respectively flowing through the U-, V-, and W-phase windings of the motor generator 10.

In the present embodiment, the control apparatus 70 responsible for conducting the field-oriented control loop functions as an operation apparatus configured to turn on and off the respective switching elements Sαβ to control actual torque of the motor generator 10 to the motor demanded torque.

<Power Saving>

In a power saving process, when it is determined that a temperature of at least one of the switching elements Sαβ (hereinafter referred to as an element temperature Tsw) detected by the corresponding element temperature sensor 24 is high, the motor demanded torque Tm* is limited to be equal to or below a prescribed torque Tγ. When it is determined that the motor demanded torque Tm* exceeds the prescribed torque Tγ, the motor demanded torque Tm* is set to the prescribed torque Tγ. This allows collector currents of the respective switching elements Sαβ to be limited by limiting the drive of the switching elements Sαβ, thereby preventing the switching elements Sαβ from overheating.

<Hill Hold Process>

In a hill hold process, whether or not the brake pedal 55 is actuated, a braking torque is applied to the subject vehicle through energization of the braking unit 40. This can prevent the subject vehicle from moving backwards/forwards on an uphill/downhill start.

<Regenerative Brake Control>

In a regenerative braking control process, the vehicle demanded braking torque calculated on the basis of a brake actuation amount "brake" detected by the brake sensor 56 is achieved as a sum of a regenerative braking torque generated through conversion of vehicle kinetic energy into electrical energy in the motor generator 10 and a hydraulic braking torque generated by the braking unit 40. More specifically, the braking unit 40 includes a regenerative braking section 403 configured to control a braking torque applied by the braking unit such that the vehicle demanded braking torque can be achieved as a sum of the braking torque applied by the braking unit and a regenerative braking torque generated through conversion of vehicle kinetic energy into electrical energy in the main rotating machine 10 electrically connected to the power conversion circuit 20.

<Diagnostics on the Element Temperature Sensor 24>

Figure 3:
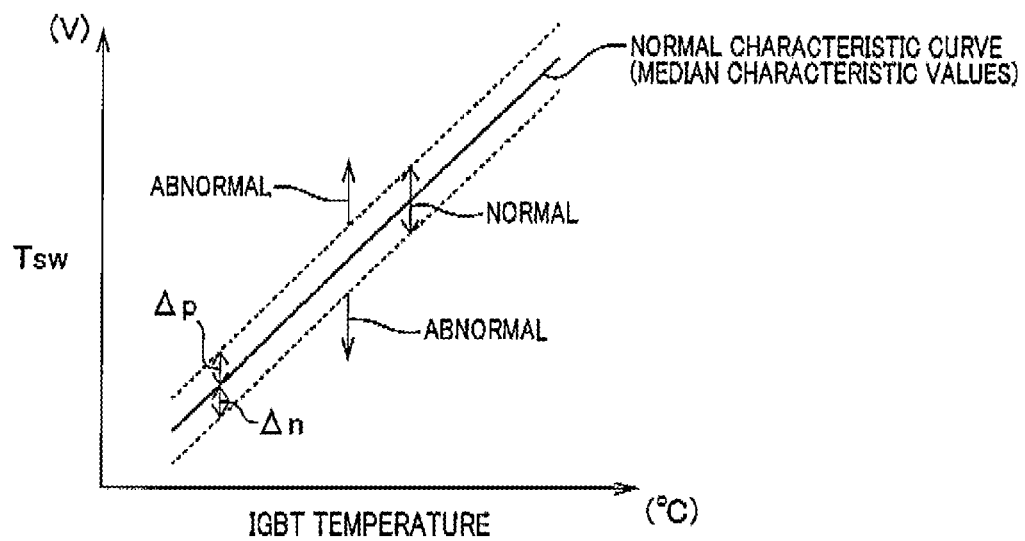
FIG. 3 is a characteristics curve of an element temperature sensor of the first embodiment.

The diagnostics on the element temperature sensor 24 includes a rationality diagnostic to determine the presence of an abnormality in the element temperature sensor 24. The abnormality in the element temperature sensor 24 refers to a characteristic abnormality in element temperature Tsw (more specifically, temperature value acquired by the control apparatus 70 from the element temperature sensor 24 via an AD convertor (not shown)) as shown in FIG. 3. FIG. 3 shows a characteristic curve of the element temperature Tsw, with the actual temperature of the switching element Sop on the horizontal axis and the element temperature Tsw on the vertical axis. In the present embodiment, the characteristic curve is shown such that the element temperature Tsw increases with an increasing actual temperature of the switching element Sαβ.

In FIG. 3, the solid line represents a characteristic curve when the element temperature sensor 24 is operating normally (or in order). More specifically, the solid line (hereinafter referred to as a normal characteristic curve) represents a characteristic curve on which the element temperature Tsw takes a median characteristic value. The median characteristic value refers to a mean of detection temperatures over a plurality of mass-produced element temperature sensors with the actual temperature of the switching element Sαβ being kept at a predetermined temperature. An acceptable range is defined by an upper limit side threshold higher than the normal characteristic curve by a predefined value Δp and a lower limit side threshold lower than the normal characteristic curve by a second pre-defined value Δn. When it is determined that the element temperature Tsw is within the acceptable range, it is determined that the element temperature sensor 24 is operating normally. Meanwhile when it is determined that the element temperature Tsw is out of the acceptable range, it is determined that an abnormality has occurred in the element temperature sensor 24.

In the present embodiment, the first predefined value and the second predefined value Δn are of constant value regardless of the actual temperature of the switching element Sαβ. The first and second predefined values Δp, Δn may be of identical value to each other or may be different from each other.

There are some disadvantages of the above prior art diagnostics. More specifically, for example, in cases where the element temperature Tsw is higher than the actual temperature of the switching element Sαβ, the power saving process may be performed although the switching element Sαβ is unlikely overheating. In such cases, since the output torque of the motor generator 10 decreases, the output torque of the engine 12 may be compensated for the decreased amount of torque. The displacement of the engine 12 may then be increased although there is no need to increase the displacement of the engine 12.

To address such disadvantage, the diagnostics on the element temperature sensor 24 will be performed. In the present embodiment, the diagnostics on the element temperature sensor 24 will be performed using the fact that the switching element Sαβ produces heat as a function of a current supply to the switching element Sαβ. This can prevent the subject vehicle from being used continuously with reduced reliability of the element temperature sensor 24.

Figure 4:
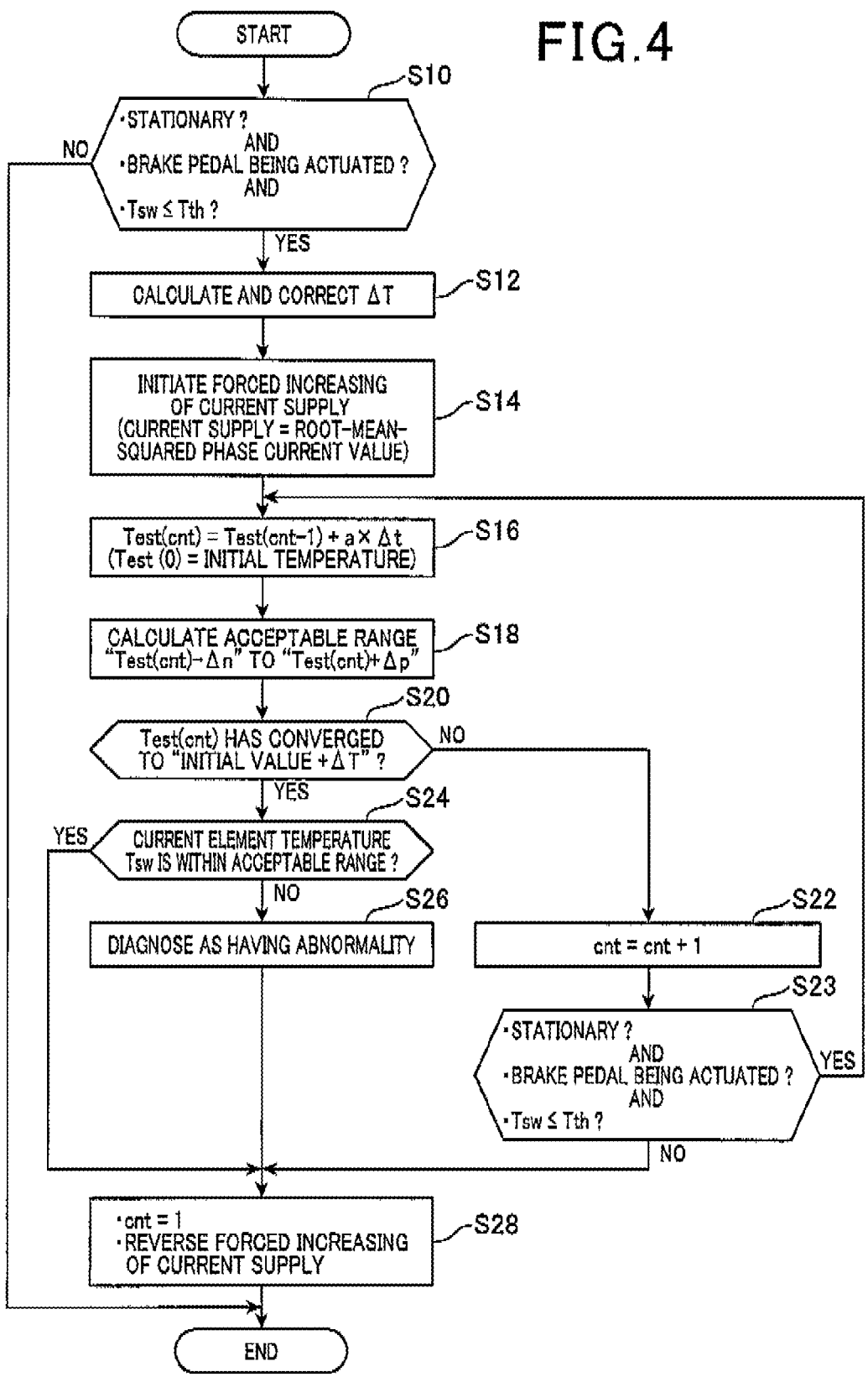
FIG. 4 is a flowchart of a diagnostics process of the first embodiment.

FIG. 4 shows a flowchart of a diagnostics process in accordance with the first embodiment, which is performed every predetermined periodic time interval. In FIG. 4, an initial value of a counter Cnt is set at 1.

First, in step S10, it is determined whether or not the conjunction of first to third conditions is true. This decision step is performed to determine whether or not the execution condition for the diagnostics is met. The first condition is that the subject vehicle is stationary. The second condition is that the brake pedal 55 is being actuated (in other words, a braking torque is being applied to the subject vehicle by the user). The third condition is that the element temperature Tsw is equal to or lower than a threshold temperature Tth. The third condition is provided to prevent the reliability of the switching element sop from decreasing due to overheating of the switching element Sαβ caused by forced increasing of current supply in step S14 (as described later). That is, in step S10, if it is determined that the element temperature Tsw is above the threshold temperature Tth, then the forced increasing of current supply is inhibited, and the diagnostics is inhibited from being executed.

Whether or not the subject vehicle is stationary may be determined, for example, by determining whether or not a vehicle traveling speed Vs determined by the vehicle-speed sensor 60 is 0. Whether or not the brake pedal 55 is operated may be determined on the basis of a brake actuation amount "brake" detected by the brake sensor 56.

If it is determined in step S10 that the conjunction of the first to third conditions is true, then the forced increasing of current supply to the switching element Sαβ is permitted. Thereafter, the process proceeds to step S12, where an amount of temperature increase ΔT is calculated. The amount of temperature increase ΔT is an estimate of deviation between the element temperature Tsw immediately before the forced increasing of current supply in step S14 and its convergence value of the element temperature Tsw. The amount of temperature increase ΔT is used to estimate the element temperature Tsw (hereinafter referred to as an estimated temperature Test). Particularly, in the present embodiment, the amount of temperature increase ΔT is corrected as a function of the element temperature Tsw immediately before the forced increasing of current supply (referred to as an initial temperature), a amount of current supply increase ΔI, a circulation flow of the cooling fluid Gc, a traveling speed Vs of the subject vehicle and an outside air temperature Tair detected by the outside air temperature sensor 62 in following manners (A)-(E) as shown in FIG. 5.

(A) The amount of temperature increase AT is decreased with a higher initial temperature. This comes from the fact that, for a higher initial temperature, the effect of heat production caused by the forced increasing of the current supply is less revealed in the increase of the element temperature Tsw. Therefore, the estimated temperature Test will be decreased with a higher initial temperature.

(B) The amount of temperature increase ΔT is increased with a larger amount of current supply increase ΔT (see FIG. 6A) caused by the forced increasing of current supply. This comes from the fact that a heat generation amount of the switching element Sαβ is increased with a larger amount of current supply increase ΔI and the amount of temperature increase ΔT is thereby increased. Therefore, the estimated temperature Test will be increased with a larger amount of current supply increase ΔI.

(C) The amount of temperature increase ΔT is decreased with a higher circulation flow Gc. The amount of temperature increase ΔT is decreased with a larger degree to which the switching element Sαβ is cooled by the cooling arrangement. This comes from the fact that an amount of temperature increase of the switching element Sαβ is decreased with a higher circulation flow Gc. Therefore, the estimated temperature Test will be decreased with a higher circulation flow Gc. The circulation flow Gc may be calculated on the basis of s drive state of the pump 30 or may be detected by a sensor adapted to directly detect the circulation flow.

(D) The amount of temperature increase ΔT is decreased with a higher traveling speed Vs of the subject vehicle. This comes from the fact that an amount of airflow blowing into an engine compartment or the like from in front of the subject vehicle increases with a higher traveling speed Vs of the subject vehicle and the cooling capacity of the switching element Sαβ is thereby increased. Therefore, the estimated temperature Test will be decreased with for a higher traveling speed Vs.

(E) The amount of temperature increase ΔT is decreased with a higher outside air temperature Tair. This comes from the fact that the temperature within the engine compartment increases with a higher outside air temperature Tair and the effect of heat production caused by the forced increasing of the current supply is less revealed in the increase of the element temperature Tsw. Therefore, the estimated temperature Test will be decreased with a higher outside air temperature Tair.

Returning to FIG. 4, in step S14, the forced increasing of current supply to the switching element Sαβ is initiated by turning on and off the switching element Sαβ. In the present embodiment, the forced increasing of current supply to the switching element Sαβ refers to forced increasing of a root-mean-squared phase current value of the motor generator 10. The use of the root-mean-squared phase current value of the motor generator 10 comes from the fact a heat generation amount of the switching element Sαβ is increased with a larger root-mean-squared phase current value of the motor generator 10. Particularly, in the present embodiment, as shown in FIG. 6A, the current supply to the switching element Sαβ is increased so as to be of square waveform. In the present embodiment, as shown in FIG. 1B, the control apparatus 70 includes a current supply increasing unit 701 that is responsible for executing the operation in step S14. The control apparatus 70 further includes a permission unit 705 that is responsible for executing the operations in steps S10 and S14.

Subsequently, in step S16, a sum of the estimated temperature Test(cnt-1) in the previous cycle and a product of a rate of increase of temperature and the time interval Δt is calculated as the estimated temperature Test(cnt) in the current control cycle. In the present embodiment, the estimated temperature Test(cnt=0) is the initial temperature. In the present embodiment, as shown in FIG. 1B, the control apparatus 70 includes an estimation unit 702 that is responsible for executing the operation in step S16.

In the present embodiment, a dead time (not shown in FIG. 4, but shown in FIG. 6) is provided from the end of the forced increasing of current supply to the beginning of the increasing of estimated temperature Test.

In addition, the rate of increase of temperature a may be corrected on the basis of at least one of the initial temperature, the mount of current supply increase ΔI, the circulation flow Gc of the cooling fluid, the vehicle traveling speed Vs and the outside air temperature Tair. More specifically, the rate of increase of temperature a may be decreased with a higher initial temperature, and/or the rate of increase of temperature a may be increased with a larger amount of current supply increase ΔI, and/or the rate of increase of temperature a may be decreased with a higher circulation flow Gc of the cooling fluid, and/or the outside air temperature Tair may be decreased with a higher vehicle traveling speed Vs.

Subsequently, in step S18, the acceptable range is defined by an upper limit side threshold "Test(cnt)+Δp" higher than the current estimated temperature Test(cnt) by a first pre-defined value Δp and a lower limit side threshold "Test(cnt)−Δn" lower than the current estimated temperature Test(cnt) by a second pre-defined value Δn. Each of the upper limit side threshold and the lower limit side threshold may be corrected as a function of the amount of temperature increase ΔT and/or the rate of increase of temperature a. In the present embodiment, as shown in FIG. 1B, the control apparatus 70 includes a range calculation unit 703 that is responsible for executing the operation in step S18.

In step S20, it is determined whether or not the current estimated temperature Test(cnt) has converged to a sum of the initial temperature and the amount of temperature increase $\Delta T$ (hereinafter referred to as a convergence value), thereby determining whether or not the estimated temperature Test is in a steady state. In the present embodiment, whether or not the current estimated temperature Test(cnt) has converged to the convergence value (i.e., the sum of the initial temperature and the amount of temperature increase $\Delta T$) may be determined on the basis of whether or not the estimated temperature Test(cnt) has reached the convergence value.

If it is determined in step S20 that the current estimated temperature Test(cnt) has not yet converged to a sum of the initial temperature and the amount of temperature Increase $\Delta T$, then the process proceeds to step S22, where the counter Cnt is incremented by one. Thereafter, the process proceeds to step S23, where it is determined whether or not the conjunction of the first to third conditions is true as in step S10. The operation in step S23 is performed to determine whether or not the diagnostics can be continued.

If it is determined in step S23 that the conjunction of the first to third conditions is false, then it is determined that the diagnostics is unable to be continued and the process proceeds to step S28. Meanwhile, if it is determined in step S23 that the conjunction of the first to third conditions is true, then it is determined that the diagnostics can be continued and then the process returns to step S16.

If it is determined in step S20 that the current estimated temperature Test(cnt) has converged to a sum of the initial temperature and the amount of temperature increase $\Delta t$, then the process proceeds to step S24, where it is determined whether or not the current element temperature Tsw is within the acceptable range last calculated. More specifically, it is determined whether or not the current element temperature Tsw is equal to or higher than the lower limit side threshold "Test(cnt)−$\Delta n$" and equal to or lower than the upper limit side threshold "Test(cnt)+$\Delta p$".

If it is determined in step S24 that the current element temperature Tsw is out of the acceptable range last calculated, then the process proceeds to step S26, where it is determined that an abnormality has occurred in the element temperature sensor 24. Information indicative of the presence of an abnormality may be stored in a nonvolatile memory (not shown) of the control apparatus 70. In the present embodiment, as shown in FIG. 1B, the control apparatus 70 includes a diagnostic unit 704 that is responsible for executing the operations in steps S24 and S26.

After the operation in step S26 is completed, if it is determined in step S23 that the conjunction of the first to third conditions is false, or if it is determined in step S24 that the current element temperature Tsw is within the acceptable range last calculated, the process proceeds to step S28, where the value of the counter Cnt is set to 1 and the forced increasing of current supply to the switching element S$\alpha\beta$ is reversed.

If it is determined in step S10 that the conjunction of the first to third conditions is false or after the operation in step S28 is completed, then the process ends.

FIGS. 6A-6B show an example of diagnostics of the present embodiment. More specifically, FIG. 6A shows the course of the current supply to the switching element S$\alpha\beta$. FIG. 6B shows the course of the estimated temperature Test.

As shown in FIGS. 6A-6B, at time t1, the forced increasing of current supply to the switching element S$\alpha\beta$ is initiated.

Thereafter, at time t2, that is, a dead time after time t1, the estimated temperature Test starts to increase. The estimated temperature Test increases to a convergence value at a rate of increase of temperature a.

At time t3, the estimated temperature Test converges. Subsequently, at time t4, it is determined that the element temperature Tsw at the timing of calculating the estimated temperature test is higher than the upper limit side threshold Test(cnt)+$\Delta p$. The element temperature sensor 24 is thereby diagnosed as having an abnormality therein.

There are some benefits associated with the present embodiment set forth above.

(1) In the present embodiment, only when the subject vehicle is stationary and the brake pedal 55 is being actuated, the forced increasing of current supply to the switching element S$\alpha\beta$ is permitted. Under such a condition, even when a torque is outputted from the motor generator 10 during forced increasing of current supply to the switching element S$\alpha\beta$ for diagnosing the element temperature sensor 24, deviation of the vehicle's behavior from the user's intended behavior, caused by the output torque of the motor generator 10, can be avoided. This allows the element temperature sensor 24 to be diagnosed without decreasing drivability.

In the present embodiment, the current supply to the switching element S$\alpha\beta$ is increased with the braking torque being applied to the subject vehicle. The amount of current supply increase $\Delta I$ can thereby be set great enough to allow the presence of an abnormality in the element temperature sensor 24 to be determined and to allow the amount of current supply increase $\Delta I$ for diagnosing the element temperature sensor 24 to be stabilized. This leads to enhancement of the accuracy of diagnosing the element temperature sensor 24.

(2) In the present embodiment, the amount of temperature increase $\Delta T$ is corrected as a function of at least one of the initial temperature, the amount of current supply increase $\Delta I$, the circulation flow Gc of the cooling fluid, the vehicle traveling speed Vs and the outside air temperature Tair. This can advantageously increase the accuracy of calculating the estimated temperature Test and can thus advantageously increase the accuracy of diagnosing the element temperature sensor 24.

(3) When it is determined that the element temperature Tsw is higher than the threshold temperature Tth, the forced increasing of current supply is inhibited. This can prevent reliability of the switching element S$\alpha\beta$ from decreasing during diagnosing the element temperature sensor 24.

Second Embodiment

There will now be explained a second embodiment of the present invention. Only differences of the second embodiment from the first embodiment will be explained with reference to the accompanying drawings.

In the present embodiment, the estimated temperature Test is calculated using other calculation techniques including a calculation technique using a moving average operation, a calculation technique using a low-pass filtering operation, and a calculation technique using a smoothing operation.

The calculation technique using the moving average operation will now be explained.

Figure 7:
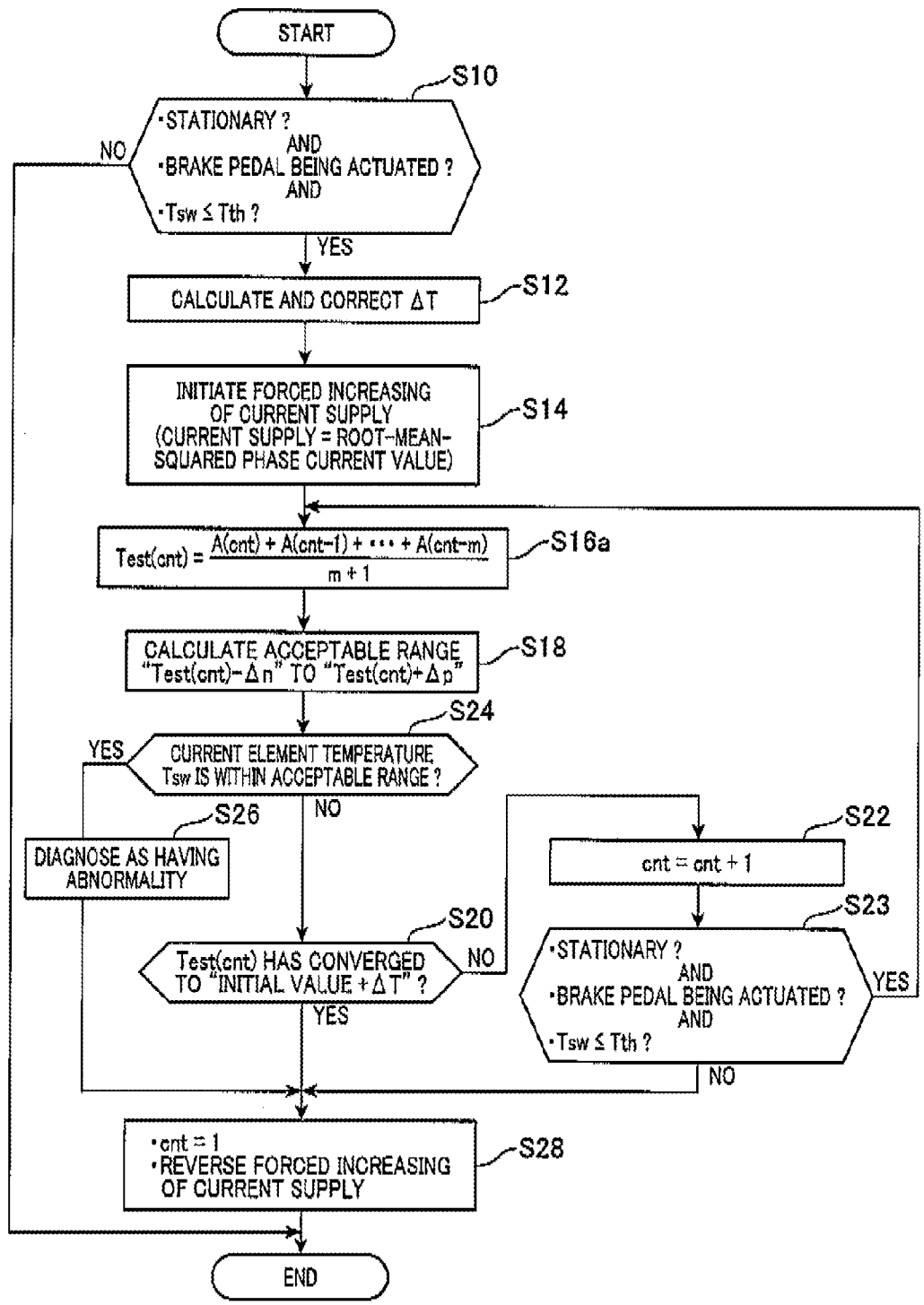
FIG. 7 is a flowchart of a diagnostics process in accordance with a second embodiment of the present invention.

FIG. 7 shows a flowchart of a diagnostics process in accordance with the second embodiment, which is performed in the control apparatus 70 every predetermined periodic time interval. As for similar steps as in FIG. 4, similar step numbers are assigned thereto for convenience.

In step 16a subsequent to step S14 of the diagnostics process, the estimated temperature Test(cnt) is calculated using the simple moving average operation, where As represent current supply data as inputs to the simple moving average operation (see FIG. 8A). In step S16a, a simple moving average of m current supply data samples is calculated as the estimated temperature Test.

After the operation in step S16a is completed, the process proceeds to step S24 through step S18. If it is determined in step S24 that the current element temperature Tsw is within the acceptable range last calculated, then the process proceeds to step S20. In the present embodiment, whether or not the estimated temperature Test(cnt) has converged to a convergence value (i.e., a sum of the initial temperature and the amount of temperature increase $\Delta T$) may be determined, for example, by determining whether or not a deviation between the estimated temperature Test(cnt) and the convergence value is equal to or less than a predetermined value (e.g., very small value).

If it is determined in step S24 that the current element temperature Tsw is out of the acceptable range last calculated, then the process proceeds to step S26, where it is determined that an abnormality has occurred in the element temperature sensor 24.

After the operation in step S26 is completed, if it is determined in step S23 that the conjunction of the first to third conditions is false, or if it is determined in step S20 that the estimated temperature Test(cnt) has converged, the process proceeds to step S28, where the value of the counter Cnt is set to 1 and the forced increasing of current supply to the switching element $S\alpha\beta$ is terminated.

If it is determined in step S10 that the conjunction of the first to third conditions is false or after the operation in step S28 is completed, then the process ends.

Figure 8:
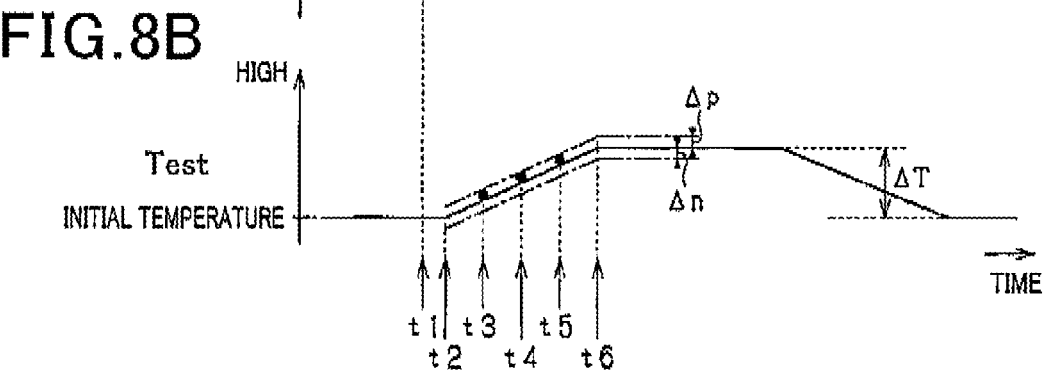
FIGS. 8A and 8B are an example of a timing chart for the diagnostics process of the second embodiment.

FIG. 8 shows an example of diagnostics. FIG. 8 corresponds to FIG. 6.

In FIG. 8, at time t1, the forced increasing of current supply to the switching element $S\alpha\beta$ is initiated. At time t2, that is, a dead time after time t1, the estimated temperature Test starts to increase. Thereafter, plural diagnostics processes are performed (at time t3, at time t4, and at time 5 in the example of FIG. 8) until the estimated temperature Test converges at time t6. That is, in each control cycle, the estimated temperature Test calculated in the cycle is used to diagnose the element temperature sensor 24. In the present embodiment, as an example, the element temperature sensor 24 is diagnosed as having no abnormality. In addition, in the present embodiment, all the estimated temperatures Test calculated in the plural diagnostics processes are used to diagnose the element temperature sensor 24. Alternatively, at least two of the estimated temperatures Test calculated in the plural diagnostics processes may be used to diagnose the element temperature sensor 24.

The calculation technique using the low-pass filtering operation will now be explained.

Figure 9:
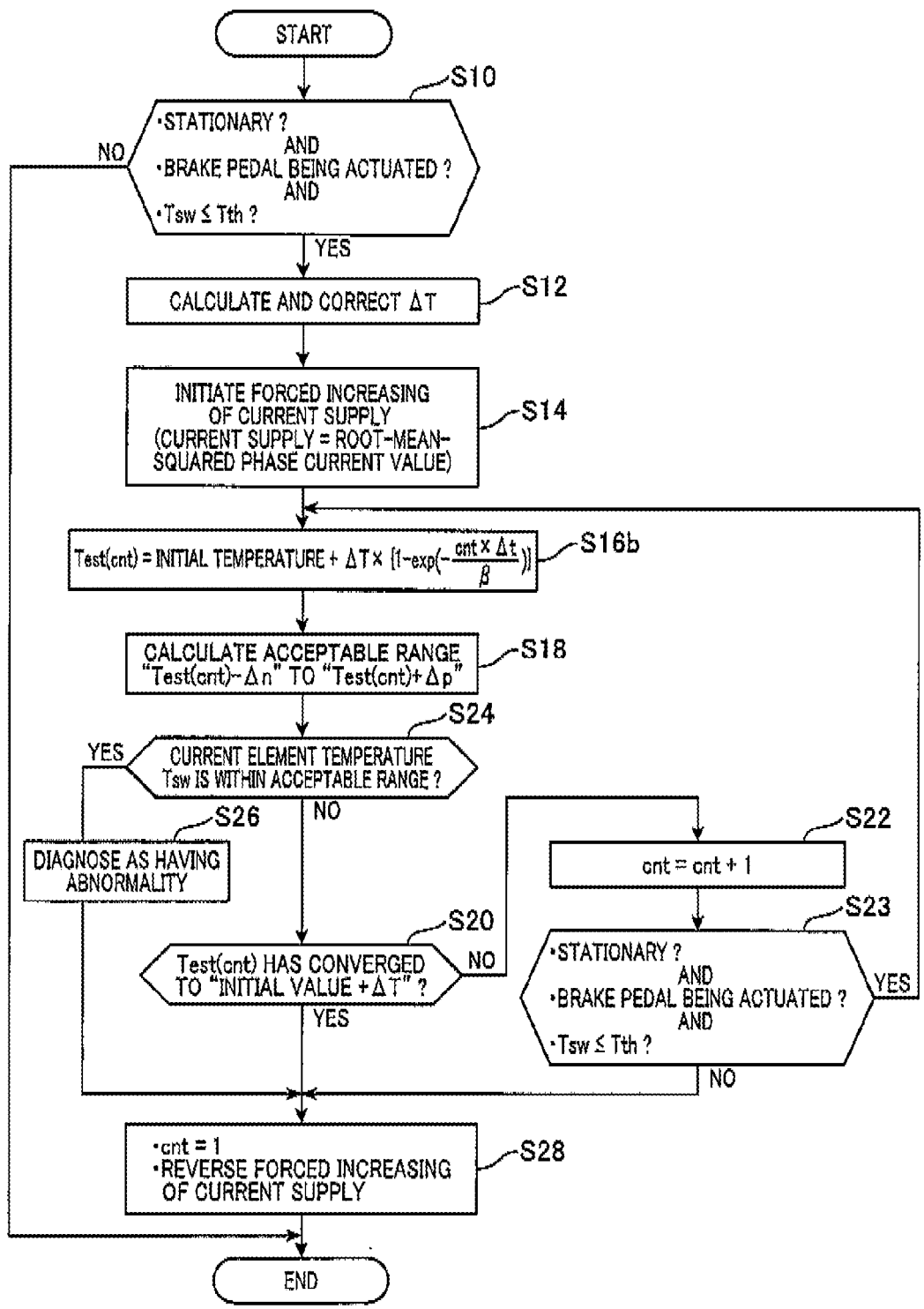
FIG. 9 is a flowchart of a diagnostics process of the second embodiment.

FIG. 9 shows a flowchart of a diagnostics process in accordance with the present embodiment, which is performed in the control apparatus 70 every predetermined periodic time interval. As for similar steps as in FIG. 7, similar step numbers are assigned thereto for convenience.

In step 16b subsequent to step S14 of the diagnostics process, the estimated temperature Test(cnt) is calculated using the low-pass filtering operation, where β represents a positive number and $\Delta t$ represents a control periodic interval.

If it is determined in step S10 that the conjunction of the first to third conditions is false or after the operation in step S28 is completed, then the process ends.

Figure 10:
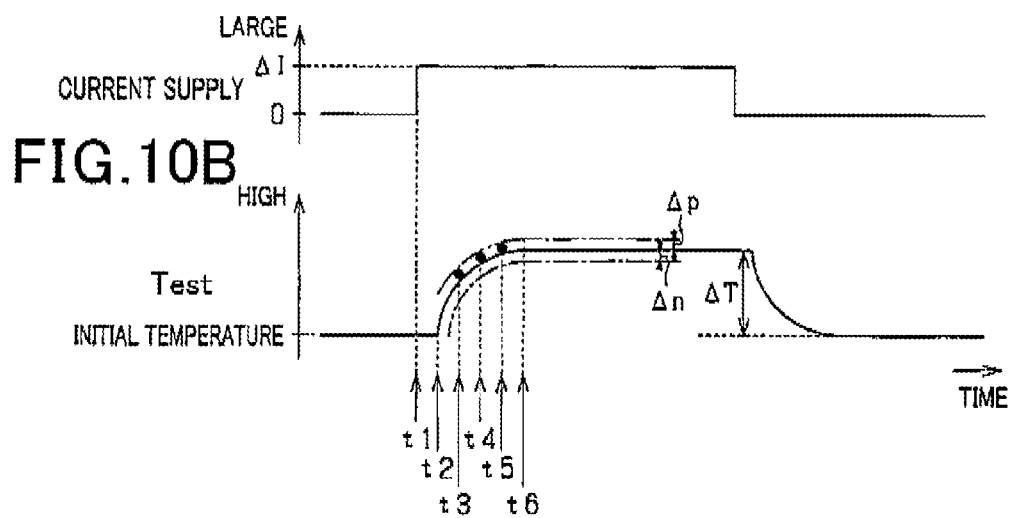
FIGS. 10A and 10B are an example of a timing chart for the diagnostics process of the second embodiment.

FIG. 10 shows an example of diagnostics. FIG. 10 corresponds to FIG. 8.

In FIG. 10, at time t1, the forced increasing of current supply to the switching element $S\alpha\beta$ is initiated. At time t2, that is, a dead time after time t1, the estimated temperature Test starts to increase. Thereafter, plural diagnostics processes are performed (at time t3, at time t4, and at time 5 in the example of FIG. 10) until the estimated temperature Test converges at time t6. In the present embodiment, as an example, as in FIG. 8, the element temperature sensor 24 is diagnosed as having no abnormality.

The calculation technique using the smoothing operation will now be explained.

Figure 11:
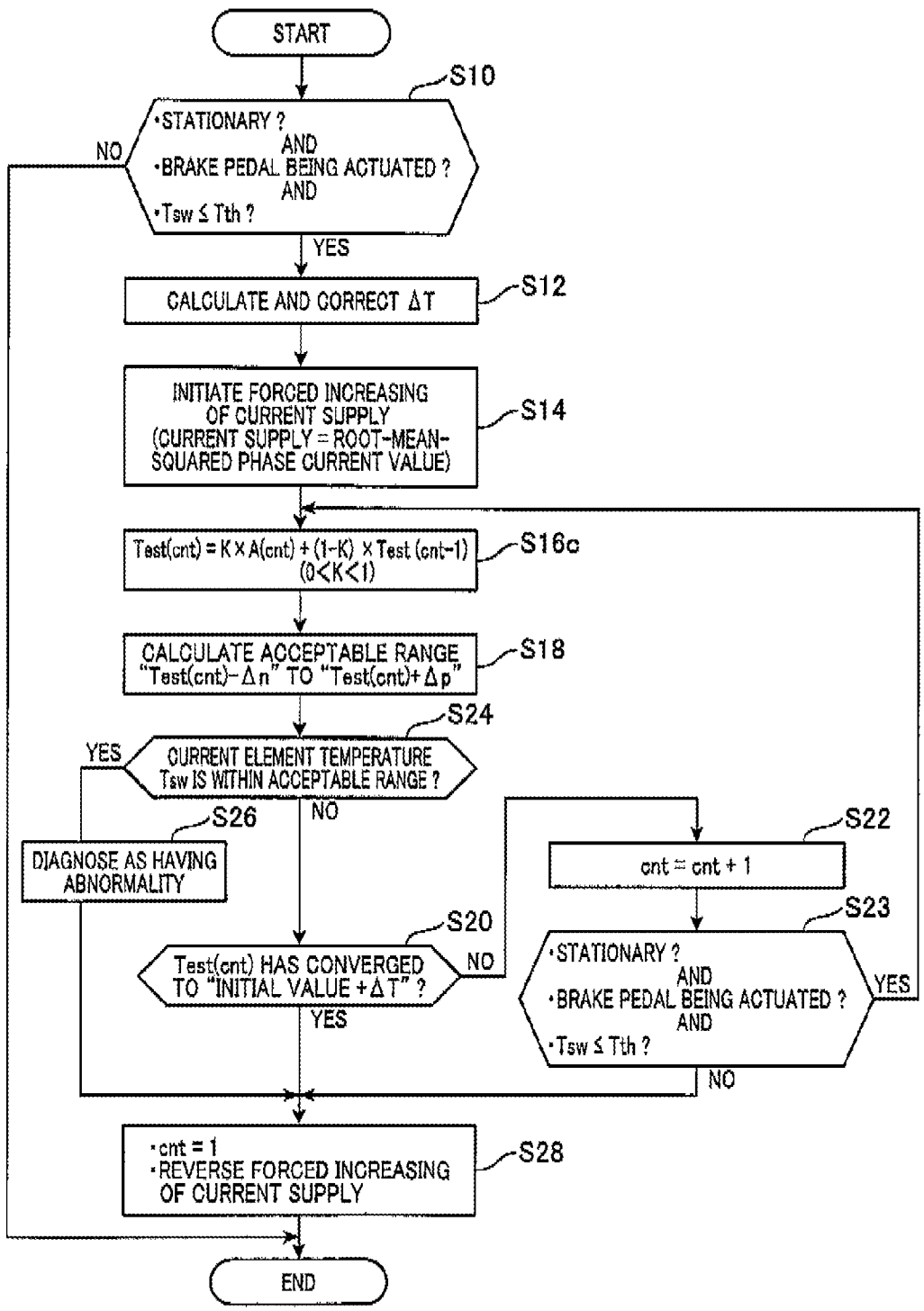
FIG. 11 is a flowchart of a diagnostics process of the second embodiment.

FIG. 11 shows a flowchart of a diagnostics process in accordance with the second embodiment, which is performed in the control apparatus 70 every predetermined periodic time interval. As for similar steps as in FIG. 7, similar step numbers are assigned thereto for convenience.

In step 16c subsequent to step S14 of the diagnostics process, the estimated temperature Test(cnt) is calculated using the smoothing operation. More specifically, a sum of first and second terms (see FIG. 11), where the first term is a product of the current supply A in the current control cycle and a smoothing coefficient K (0<K<1) and the second term is a product of the estimated temperature in the previous control cycle Test(cnt-1) and a value of one minus the coefficient K, is calculated as the estimated temperature Test(cnt) in the current cycle.

As with the rate of increase of temperature a in the first embodiment, the smoothing coefficient K may be corrected on the basis of at least one of the initial temperature, the amount of current supply increase $\Delta I$, the circulation flow Gc of the cooling fluid, the vehicle traveling speed Vs and the outside air temperature Tair. More specifically, the smoothing coefficient K may be decreased with a higher initial temperature, and/or the smoothing coefficient K may be increased with a larger amount of current supply increase $\Delta I$, and/or the smoothing coefficient K may be decreased with a higher circulation flow Gc of the cooling fluid, and/or the smoothing coefficient K may be decreased with a higher vehicle traveling speed Vs or with a higher outside air temperature Tair.

If it is determined in step S10 that the conjunction of the first to third conditions is false or after the operation in step S28 a series of processing operations is completed, then the process ends.

FIG. 12 shows an example of diagnostics. FIG. 12 corresponds to FIG. 8.

In FIG. 12, at time t1, the forced increasing of current supply to the switching element $S\alpha\beta$ is initiated. At time t2, that is, a dead time after time t1, the estimated temperature Test starts to increase. Thereafter, plural diagnostics processes are performed (at time t3, at time t4, at time 5 and at time t6 in the example of FIG. 12) until the estimated temperature Test converges at time t7. In the present embodiment, as an example, as in FIG. 8, the element temperature sensor 24 is diagnosed as having no abnormality.

The reasons why such various techniques for calculating the estimated temperature Test are used will now be explained.

In the present embodiment, various techniques for calculating the estimated temperature Test are used. This comes from the fact that a temperature transition of the switching element $S\alpha\beta$ may vary as a function of a physical property value of the switching element $S\alpha\beta$ and the responsiveness of the element temperature sensor 24. The present embodiment has focused on the heat capacity of the switching element so as the physical property value.

FIG. 6, FIG. 8, FIG. 10, and FIG. 12 show examples different in heat capacity of the switching element $S\alpha\beta$ and responsiveness of the element temperature sensor 24. More specifically, FIG. 6 shows an example of a small heat capacity of the switching element Sαβ and a high responsiveness of the element temperature sensor 24. FIG. 8 shows an example of a small heat capacity of the switching element Sαβ and a lower responsiveness of the element temperature sensor 24 than in FIG. 6. FIG. 10 shows an example of a larger heat capacity of the switching element Sαβ than in FIGS. 6, 8 and a high responsiveness of the element temperature sensor 24. FIG. 12 shows an example of a large heat capacity of the switching element Sαβ and a low responsiveness of the element temperature sensor 24.

As shown in FIG. 6, FIG. 8, FIG. 10, and FIG. 12, the temperature transition of the switching, element Sαβ varies as a function of the heat capacity of the switching element Sαβ and the responsiveness of the element temperature sensor 24. Hence, in the present embodiment, as shown in FIG. 13, the amount of temperature increase $\Delta T$ is set to a smaller value for a larger heat capacity of the switching element Sαβ. As such, the calculation technique used to calculate the estimated temperature Test may be selected that is suitable for the heat capacity of the switching element Sαβ and the responsiveness of the element temperature sensor 24 when designing the control apparatus 70.

The present embodiment can provide similar benefits as provided in the first embodiment.

(4) The estimated temperature Test is calculated in each control cycle during a time period from when the element temperature Tsw starts to increase due to the forced increasing of current supply to when the element temperature Tsw becomes steady. The estimated temperature Test in each cycle is used in the diagnostics on the element temperature sensor 24. This, even when noise is introduced in the estimated temperature Test, can prevent decreasing of the accuracy of diagnosing the element temperature sensor 24. That is, this can enhance the immunity of the diagnostics to noise.

(5) The amount of temperature increase $\Delta T$ is set to a smaller value for a larger heat capacity of the switching element Sαβ. This can improve the accuracy of diagnosing the element temperature sensor 24.

Third Embodiment

There will now be explained a third embodiment of the present invention. Only differences of the third embodiment from the first embodiment will be explained with reference to the accompanying drawings.

In the present embodiment, there are provided two alternative execution conditions for the diagnostics on the element temperature sensor 24.

Figure 14:
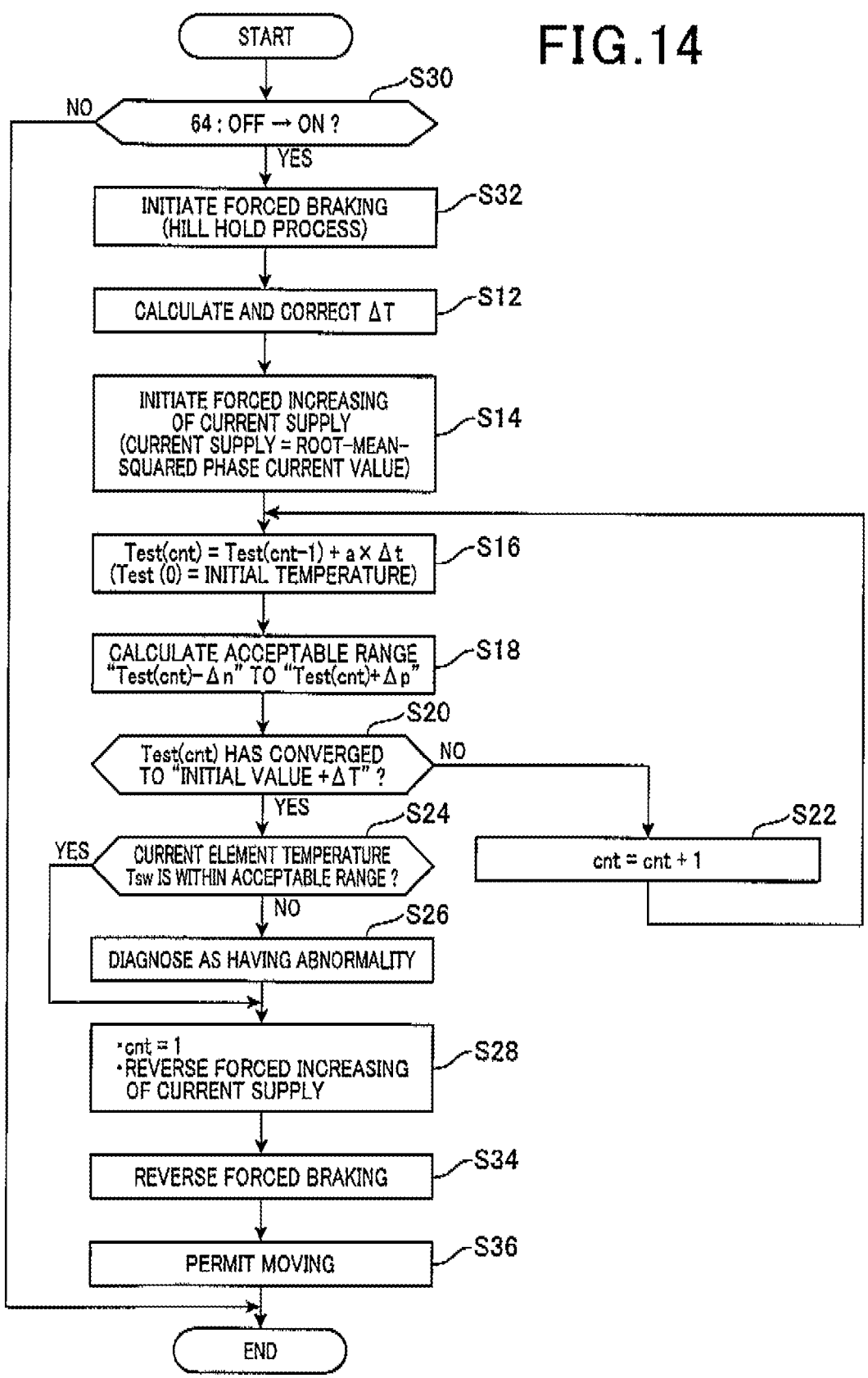
FIG. 14 is a flowchart of a diagnostics process in accordance with a third embodiment of the present invention.

FIG. 14 shows a flowchart of a diagnostics process related to the first alternative execution condition, which is performed in the control apparatus 70 every predetermined periodic time interval. As for similar steps as in FIG. 4, similar step numbers are assigned thereto for convenience.

First, in step S30, it is determined whether or not the travel authorization switch 64 has just been switched from OFF to ON. This decision step is performed to determine whether or not initiation of the vehicle control has been directed by the user of the subject vehicle. It is assumed that the vehicle control is initiated only when the vehicle is stationary.

If it is determined in step S30 that the travel authorization switch 64 has just been switched from OFF to ON, then the forced increasing of current supply is permitted. Thereafter the process proceeds to step S32, where the forced braking of the subject vehicle is initiated. The forced braking refers to maintaining the subject vehicle in the stationary state by forcing the braking unit 40 to apply a braking torque to the subject vehicle whether or not the brake pedal 55 is actuated by the user. In the present embodiment, this forced braking is performed by leveraging the hill hold process. In the present embodiment, as shown in FIG. 1C, the braking unit 40 includes a forced braking section 402 that is responsible for executing the operations in steps S30 and S32. That is, the forced braking section 402 is configured to apply the braking torque to the vehicle whether or not the brake pedal 55 is actuated by the user and when it is determined that the vehicle is stationary.

After the operation in step S32 is completed, the process proceeds to step S12. After the operation in step S26 is completed, or if it is determined in step S24 that the current element temperature Tsw is within the acceptable range last calculated, the process proceeds to step S34 through step S28. In step S34, the forced braking is reversed. Thereafter in step S36, the subject vehicle is permitted to start moving.

If it is determined in step S30 that the travel authorization switch 64 has not yet been switched from OFF to ON or after the operation in step 36 is completed, then the process ends.

Figure 15:
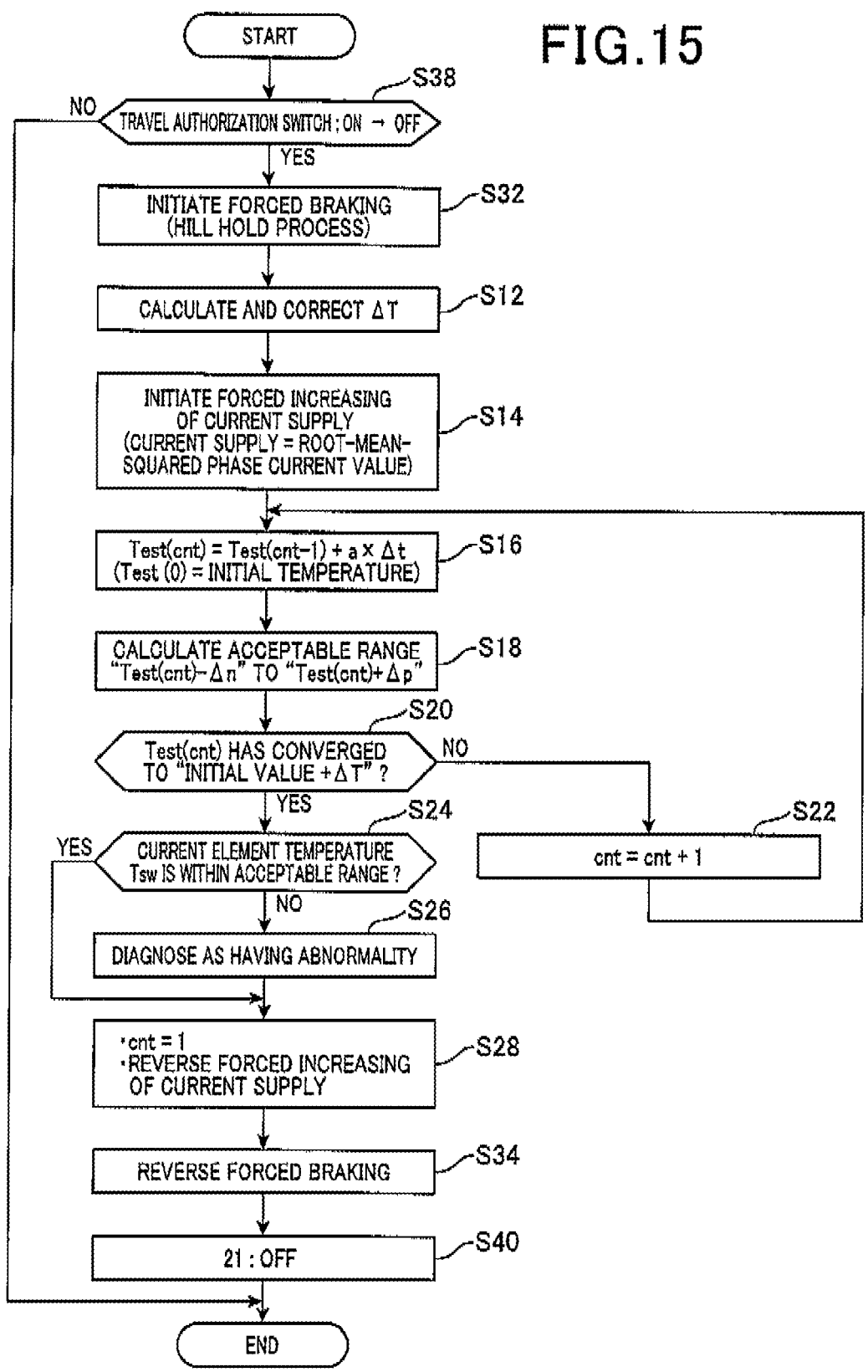
FIG. 15 is a flowchart of a diagnostics process of the third embodiment.

FIG. 15 shows a flowchart of a diagnostics process related to the second alternative execution condition, which is performed in the control apparatus 70 every predetermined periodic time interval. As for similar steps as in FIG. 14, similar step numbers are assigned thereto for convenience.

First, in step S38, it is determined whether or not the travel authorization switch 64 has just been switched from ON to OFF. This decision step is performed to determine whether or not termination of the vehicle control has been directed by the user of the subject vehicle. It is assumed that the vehicle control is terminated only when the vehicle is stationary.

If it is determined in step S38 that the travel authorization switch 64 has just been switched from ON to OFF, then the forced increasing of current supply is permitted and then the process proceeds to step S32. After the operation in step S34 is completed, the process proceeds to step S40, where the main relay 21 is turned off. Turing off the main relay 21 at this timing can ensure a diagnosis time for diagnosing element temperature sensor 24.

Meanwhile if it is determined in step S38 that the travel authorization switch 64 has not yet been switched from ON to OFF, or after the main relay 21 is turned off in step S40, the process ends.

As above, in the present embodiment, the forced increasing of current supply is permitted during a time period from when the initiation of the vehicle control is directed by the user operating the travel authorization switch 64 to when the vehicle starts moving. This can increase opportunities for diagnosing the element temperature sensor 24 and can prevent the vehicle from continuing to be used with reduced reliability of the element temperature sensor 24 as much as possible.

In addition, in the present embodiment, the forced increasing of current supply is permitted after the termination of the vehicle control is directed by the user operating the travel authorization switch 64. Even such control logic can also increase opportunities for diagnosing the element temperature sensor 24.

Fourth Embodiment

There will now be explained a fourth embodiment of the present invention. Only differences of the fourth embodiment from the third embodiment will be explained with reference to the accompanying drawings.

In the present embodiment, there is provided another alternative execution condition for the diagnostics on the element temperature sensor 24.

Figure 16:
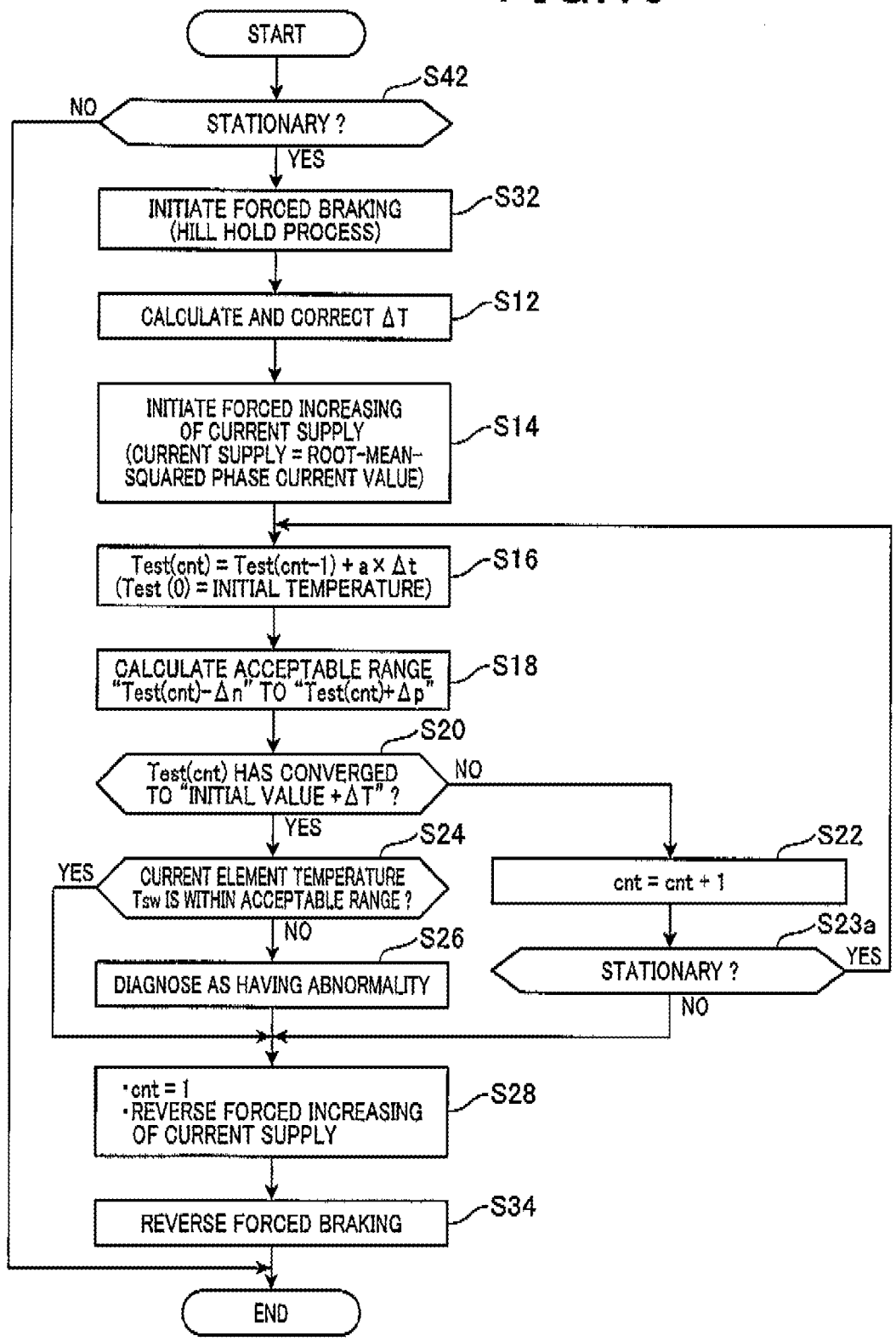
FIG. 16 is a flowchart of a diagnostics process in accordance with a fourth embodiment of the present invention.

FIG. 16 shows a flowchart of a diagnostics process in accordance with the fourth embodiment, which is performed in the control apparatus 70 every predetermined periodic time interval. As for similar steps as in FIGS. 4 and 14 similar step numbers are assigned thereto for convenience.

First, in step S42, it is determined whether or not the subject vehicle is stationary. If it is determined in step S42 that the subject vehicle is stationary, then the process proceeds to step S42.

After the operation in step S26 is completed, or if it is determined in step S24 that the current element temperature Tsw is within the acceptable range last calculated, the process proceeds to step S28. After the operation in step S28 is completed, the process proceeds to step S34. The operation in step 23a is similar to the operation in step S42 and provided for the similar purpose as in step S23 of FIG. 4. That is, the operation in step S23a is performed to determine whether or not the diagnostics can be continued.

If it is determined in step S42 that the subject vehicle is not stationary, or after the operation in step S34 is completed, the process ends.

As such, in the present embodiment, when it is determined that the subject vehicle is stationary, the diagnostics process on the element temperature sensor 24 is performed whether or not the brake pedal 55 is actuated. A braking torque is forced to be applied to the subject vehicle according to the hill hold process. With such a configuration, after the initiation of the vehicle control is directed by the user when the subject vehicle is stationary, the element temperature sensor 24 is allowed to be diagnosed by increasing the current supply to the element temperature sensor 24. This can advantageously increase opportunities for diagnosing the element temperature sensor 24.

Fifth Embodiment

There will now be explained a fifth embodiment of the present invention. Only differences of the fifth embodiment from the first embodiment will be explained with reference to the accompanying drawings.

In the present embodiment, there is provided another alternative execution condition for the diagnostics on the element temperature sensor 24.

Figure 17:
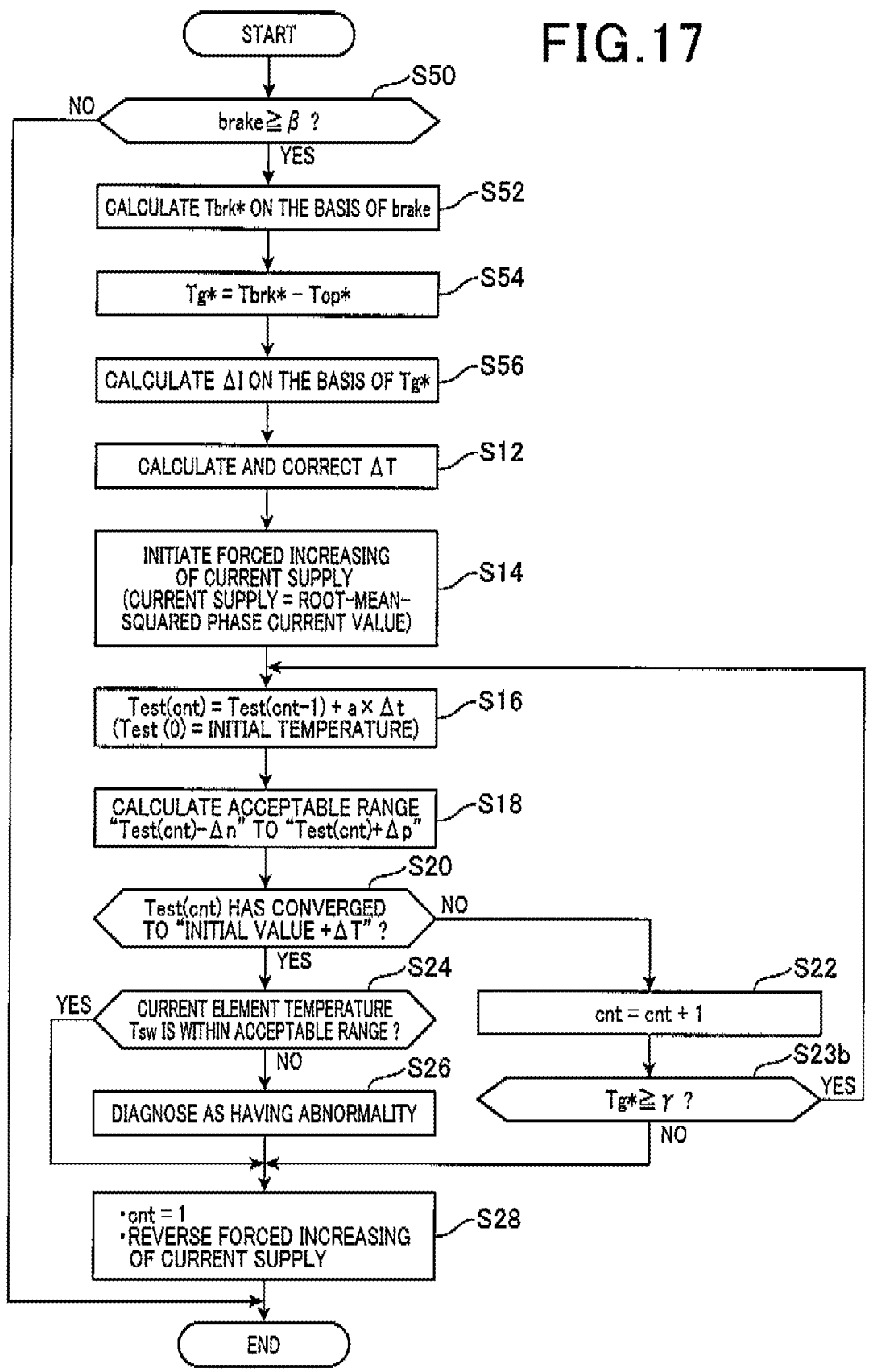
FIG. 17 is a flowchart of a diagnostics process in accordance with a fifth embodiment of the present invention.

FIG. 17 shows a flowchart of a diagnostics process in accordance with the fifth embodiment, which is performed in the control apparatus 70 every predetermined periodic time interval. As for similar steps as in FIG. 4, similar step numbers are assigned thereto for convenience.

First, in step S50, it is determined whether or not a brake actuation amount "brake" is equal to or greater than a specified amount β. This decision step is performed to determine whether or not a regenerative braking torque generated in the regenerative braking control process is high enough to produce an amount of current supply increase ΔI for the diagnostics on the element temperature sensor 24.

If it is determined in step S50 that the brake actuation amount brake is equal to or greater than the specified amount β, then the forced increasing of current supply is permitted, and in step 52 a demanded braking torque Tbrk* is calculated on the basis of the brake actuation amount brake. Thereafter, in step S54, a demanded regenerative braking torque Tg* is calculated by subtracting a demanded hydraulic braking torque Top* from the demanded braking torque Tbrk*. The demanded hydraulic braking torque Top* refers to a braking torque applied by the braking unit 40. The inverter 20 is operated to control an actual regenerative braking torque to the demanded regenerative braking torque Tg*. And the braking unit 40 is operated to control an actual hydraulic braking torque to the demanded hydraulic braking torque Top*.

Subsequently, in step S56, an amount of current supply increase ΔI is calculated on the basis of the demanded regenerative braking torque Tg*. In the present embodiment, the amount of current supply increase ΔI is calculated so as to increase with a higher demanded regenerative braking torque Tg*. Thereafter the process proceeds to step S14 thorough step S12. The current supply can thereby be forced to increase during the regenerative braking control process. It can be assumed that the regenerative braking control process is performed not only when the subject vehicle is decelerated by operating the brake pedal 55, but also when the subject vehicle is going downhill while keeping a traveling speed, for example, by actuating the brake pedal 55.

In the present embodiment, the operation in step S23 (see FIG. 4) is replaced with the operation in step 23b where it is determined whether or not the demanded regenerative braking torque Tg* is equal to or higher than a predetermined torque γ. This decision step is provided for the similar purpose as in step S23 of FIG. 4. That is, when the demanded regenerative braking torque T* is low, the amount of current supply increase ΔI is unlikely to be set large enough to determine the presence of an abnormality in the element temperature sensor 24. Therefore, it is assumed that, when the demanded regenerative braking torque Tg* is low, the diagnostics on the element temperature sensor 24 cannot be continued.

If it is determined in step S50 that the brake actuation amount brake is less than the specified amount β, or after the operation in step S28 is completed, the process ends.

As above, in the present embodiment, the diagnostics on the element temperature sensor 24 can be performed using the regenerative braking control process.

Sixth Embodiment

There will now be explained a sixth embodiment of the present invention. Only differences of the sixth embodiment from the first embodiment will be explained with reference to the accompanying drawings.

In the present embodiment, another diagnostics technique on the element temperature sensor 24 is provided. More specifically, a d-axis command current id* is steered such that the forced increasing of the current supply to the element temperature sensor 24 does not result in a changing of the motor demanded torque Tm*.

Figure 18A:
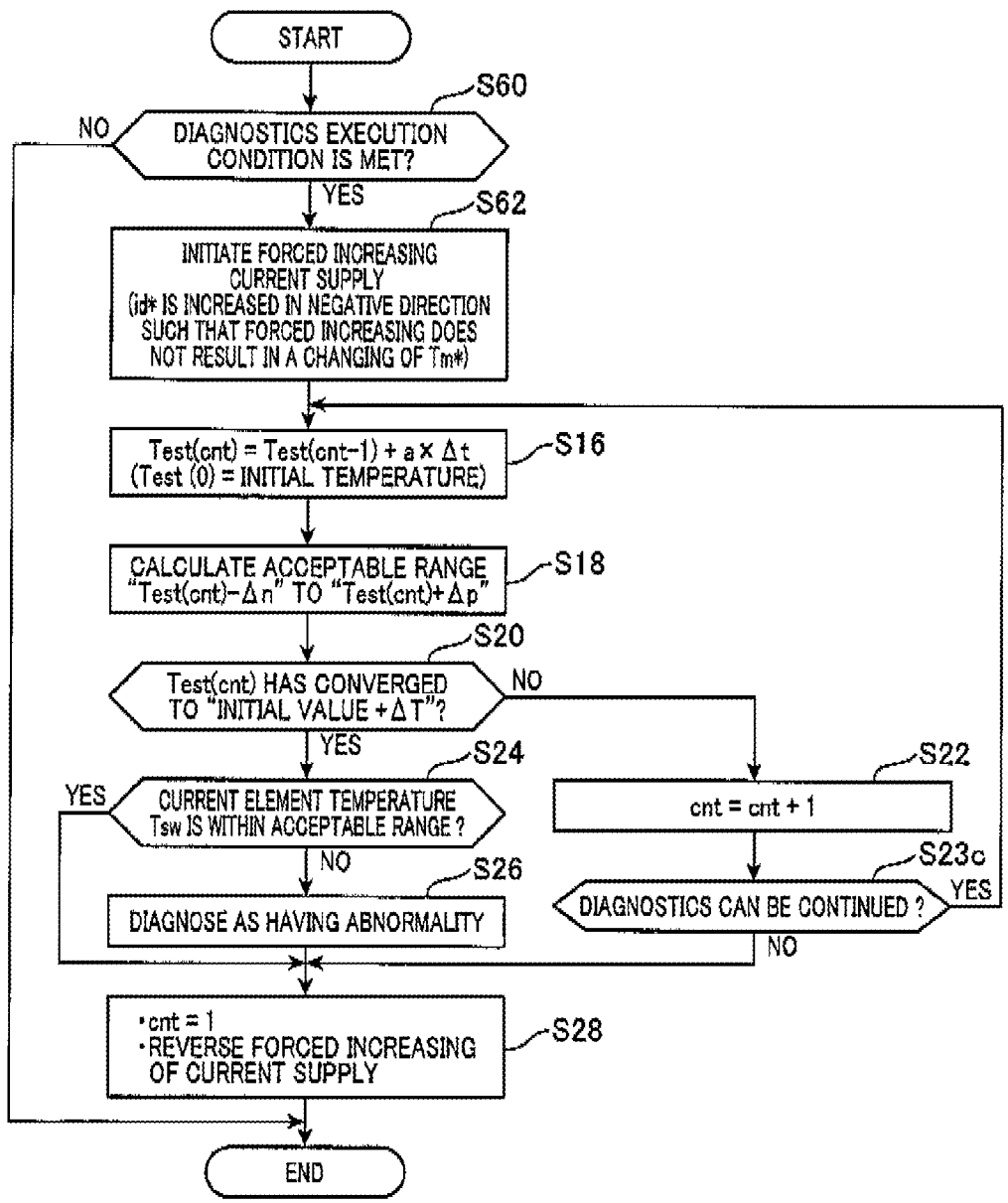
FIG. 18A is a flowchart of a diagnostics process in accordance with a sixth embodiment of the present invention.

FIG. 18A shows a flowchart of a diagnostics process in accordance with the sixth embodiment, which is performed in the control apparatus 70 every predetermined periodic time interval. As for similar steps as in FIG. 4, similar step numbers are assigned thereto for convenience.

First, in step S60, it is determined whether or not a diagnostics execution condition is met, where the diagnostics execution condition is set such that the diagnostics on the element temperature sensor 24 can be executed at a predetermined frequency. More specifically, the diagnostics execution condition is whether or not a prescribed time period has elapsed since the previous diagnostics.

If it is in step S60 that the diagnostics execution condition is met, then the process proceeds to step S62, where a d-axis command current id* and a q-axis command current iq* are steered such that the forced increasing of the current supply to the element temperature sensor 24 does not result in a changing of the motor demanded torque Tm*. Particularly, in the present embodiment, the d-axis command current id* is increased in a direction in which the magnetic flux decreases (demagnetizing direction also referred to as a d-axis negative direction). This allows the d-axis current idr to compensate for a shortage of the current supply required for the diagnostics on the element temperature sensor 24. It should be noted that the d-axis current less contributes to the output torque of the motor generator 10 as compared with the q-axis current. Therefore, the current supply is allowed to be increased by steering the d-axis current such that the increasing of the current supply does not result in a changing of the motor demanded torque Tm*.

Figure 18B:
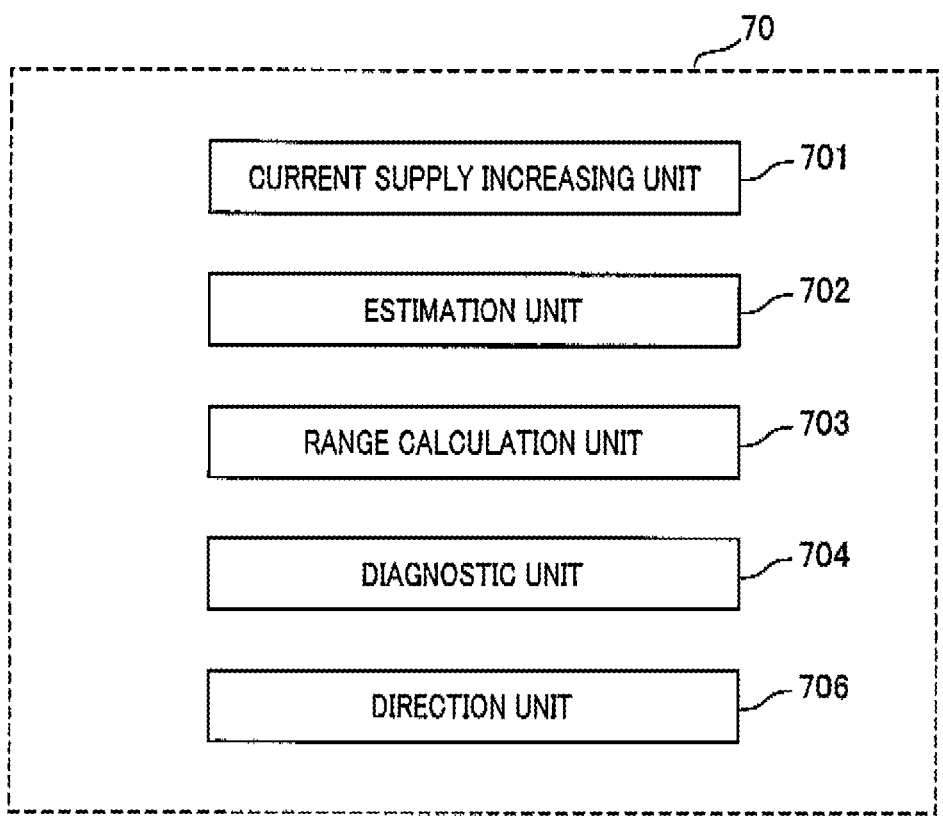
FIG. 18B is a block diagram of a control apparatus of the sixth embodiment.

In the present embodiment, as shown in FIG. 18B, the control apparatus 70 includes a current supply increasing unit 701 that is responsible for executing the operation in step S62. The control apparatus 70 further includes a direction unit 706 that is responsible for executing the operations in steps S60 and S62.

Figure 19A:
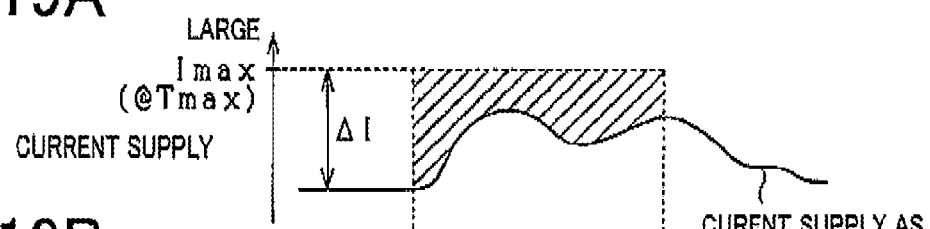
FIGS. 19A and 19B are an example of timing chart for the diagnostics process of the sixth embodiment.
Figure 19B:
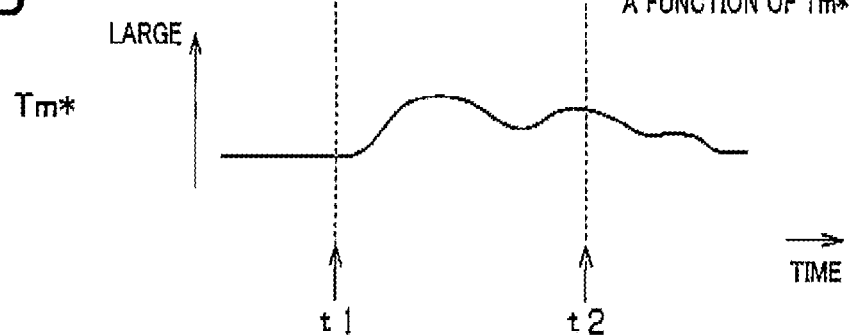

In the present embodiment, as shown in FIG. 19, the current supply is increased toward a maximum current supply Imax that is required to set the motor demanded torque Tm* to its acceptable upper limit Tmax. FIG. 19A shows the development of the current supply to the switching element Sαβ. FIG. 19B shows the development of the motor demanded torque Tm*. In FIG. 19A, the solid line represents the development of the current supply corresponding to the motor demanded torque Tm* shown in FIG. 19B.

In an example shown in FIGS. 19A, 19B, at time t1, the current supply starts to Increase toward the maximum current supply Imax. The current supply is kept at the maximum current supply Imax during a time period of time t1 to t2. In FIG. 19A, the shortage of the current supply compensated for by the d-axis current idr is indicated by the hatched line.

Returning to FIG. 18A, after the operation in step S62 is completed, the process proceeds to step S16. In the present embodiment, the operation in step S23 (see FIG. 4) is replaced with the operation in step 23c where it is determined whether or not the diagnostics on the element temperature sensor 24 can be continued. The operation in step 23c may be set arbitrarily as long as it allows it to be determined whether or not the forced increasing of current supply has to be suspended.

If it is determined in step S60 that the diagnostics execution condition is not met, or after the operation in step S28 is completed, the process ends.

The present embodiment set forth above can provide following additional advantages to the advantage (2) of the first embodiment.

(6) The d-axis command current id* is increased in the negative direction to increase the current supply to the element temperature sensor 24 such that the increasing of the current supply does not result in a changing of the motor demanded torque Tm*. This can avoid deviation of the vehicle's behavior from the user's intended behavior, thereby allowing the element temperature sensor 24 to be diagnosed without decreasing drivability.

In the present embodiment, the current supply is forced to increase such that the forced increasing of the current supply does not result in a changing of the motor demanded torque Tm*, which allows the current supply to be increased for the diagnostics on the element temperature sensor 24 during normal traveling of the subject vehicle. This can advantageously increase opportunities for diagnosing the element temperature sensor 24.

(7) In the present embodiment, the current supply to the switching element Sαβ is increased toward the maximum current supply Imax. When the current supply during the diagnostics on the element temperature sensor 24 is less than the current supply defined as a function of the motor demanded torque Tm*, the increasing of the current supply for the diagnostics will result in reduction of the motor demanded torque Tm*, which may lead to reduced drivability. In contrast, in the present embodiment, even when the acceptable upper limit Tmax required for the motor demanded torque Tm*, the increased current supply is allowed to be equal to or greater than the current supply defined as a function of the motor demanded torque Tm*. The opportunities for diagnosing the element temperature sensor 24 can thereby be ensured.

Other Embodiments

There will now be explained some other embodiments that may be devised without departing from the spirit and scope of the present invention.

<Regarding First Process of Permitting Increasing of Current Supply>

In the first embodiment, the control logic is used such that the element temperature sensor 24 is diagnosed only once after the estimated temperature Test has converged. The number of times the element temperature sensor 24 is diagnosed after the estimated temperature Test has converged is not limited to once. Alternatively, for example, the element temperature sensor 24 may be diagnosed plural times as long as the estimated temperature Test is steady after having converged. In such an alternative embodiment, if it is determined at least once or at least half the number of times the element temperature sensor 24 is diagnosed that the element temperature Tsw is out of the acceptable range, it may be determined that an abnormality has been occurred in the element temperature sensor 24.

In the second embodiment, the estimated temperature Test is calculated in each control cycle during a time period from when the detection temperature starts to increase to when the detection temperature converges (hereinafter referred to as a first time period). Alternatively, the estimated temperature Test may be calculated not only during the first time period, but also after the end of the first time period continuously. In such an alternative embodiment, the element temperature sensor 24 may continuously be diagnosed using the estimated temperature Test and the acceptable range in each control cycle during a subsequent time period to the first time period, in which the estimated temperature Test is steady.

In the first embodiment, the amount of temperature increase ΔT is decreased with a higher initial temperature (that is the element temperature Tsw immediately before the forced increasing of current supply). Alternatively, the initial temperature may be replaced with a detection temperature Ta of the invertor temperature sensor 26. That is, the amount of temperature increase AT may be decreased with a higher detection temperature Ta of the invertor temperature sensor 26. In addition, in FIG. 14, the amount of temperature increase ΔT is decreased with a higher initial temperature. Alternatively, the initial temperature may be replaced with a detection temperature Tc of the fluid temperature sensor 54. That is, the amount of temperature increase ΔT is decreased with a higher detection temperature Tc of the fluid temperature sensor 54. This comes from the observation hat the fluid temperature and the element temperature of the switching element Sαβ are substantially equal immediately before the forced increasing of current supply.

The cooling arrangement for cooling the switching element(s) Sαβ may include not only a water-cooling type cooling arrangement, but also an air-cooling type cooling arrangement having an electrically driven fan. When the cooling arrangement for cooling the switching element(s) Sαβ is of air-cooling type, the amount of temperature increase ΔT may be decreased with a larger amount of air flow blowing from the fan to the switching element(s) Sαβ.

In each of the first to fourth embodiments, the amount of current supply increase ΔI may be variably set for each diagnosis. In addition, in the fifth embodiment, the amount of current supply increase ΔI for each diagnosis may be fixed.

In the first embodiment (see FIG. 4), the element temperature sensor 24 may be diagnosed several times before the estimated temperature Test converges. In the second embodiment (see FIG. 7, FIG. 9, FIG. 11), the element temperature sensor 24 may be diagnosed only once after the estimated temperature Test has converged or may be diagnosed only once before the estimated temperature Test converges.

In FIG. 7 of the second embodiment, the estimated temperature Test may be calculated using the weighted moving average calculation. In FIG. 9, the estimated temperature Test may be calculated using not only the primary low-pass filtering operation, but also a secondary or higher low-pass filtering operation.

In FIG. 15 of the third embodiment, a power supply used to increase the current supply may be changed to another power supply. More specifically, during a time period in which discharging control is performed after the main relay 21 is turned off, where electrical charge accumulated in the smoothing capacitor 23 is consumed by the motor generator 10 through turning on and off of the switching element Sαβ, the smoothing capacitor 23 may be used as another power supply to increase the current supply.

The rotary machine may include not only the interior permanent magnet synchronous motor (IPMSM), but also a surface permanent magnet synchronous motor (SPMSM). In addition, the rotary machine may not be limited to a synchronous motor.

<Regarding Second Process of Steering d-Axis Current>

In the sixth embodiment, the current supply may be increased beyond the maximum current soppy Imax that is required to set the motor demanded torque Tm* to its acceptable upper limit Tmax.

The rotary machine may include not only the interior permanent magnet synchronous motor (IPMSM), but also a synchronous reluctance motor (SynRm).

<Regarding First and Second Processes>

The characteristic curve of the element temperature Tsw is not limited to those as shown in FIG. 3. Alternatively, for example, the characteristic curve of the element temperature Tsw may be a characteristic curve such that the element temperature Tsw decreases with a higher actual temperature of the switching element Sαβ. The first process is a process performed in the permission unit 705. The second process is a process performed in the direction unit 706.

The amount of temperature increase ΔT is corrected as shown in FIG. 5. Alternatively, the amount of temperature increase ΔT may be corrected on the basis of at least one of the initial temperature, the amount of current supply increase ΔI, the circulation flow Gc of the cooling fluid, the vehicle traveling speed Vs and the outside air temperature Tair.

The acceptable range is defined by the first predefined value Δp and the second predefined value Δn that are both fixed values. Alternatively, for example, the first predefined value Δp and the second predefined value Δn may be set variably as a function of that actual temperature of the switching element Sαβ.

The current supply to the switching element Sαβ is increased so as to be of square waveform. Alternatively, the current supply to the switching element Sαβ is increased so as to be of any waveform that allows the switching element Sαβ to be diagnosed. In addition, the current supply may be increased not in a forced manner for the diagnostics, where when a braking torque is being applied to the subject vehicle, the current supply may be increased so as to implement an energized state of the switching element Sαβ suitable of the diagnostics in the vehicle control.

In FIGS. 7, 9, 11 of the second embodiment, the estimated temperature Test is calculated and the element temperature sensor 24 is diagnosed using the estimated temperature Test and the acceptable range every control cycle during a time period from when the detection temperature starts to increase to when the detection temperature converges. Alternatively, the estimated temperature Test is calculated and the element temperature sensor 24 is diagnosed using the estimated temperature Test and the acceptable range every two or more control cycles during a time period from when the detection temperature starts to increase to when the detection temperature converges.

The power conversion circuit may include not only the three-phase inverter, but also a full-bridge circuit. The switching element (s) of the power conversion circuit may include not only the IGBT, but also a MOSFET.

The current supply may include not only the root-mean-squared phase current value, but also an amplitude of the sinusoidal phase current.

What is claimed is:

1. An apparatus for diagnosing a temperature detection unit, mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element, the apparatus comprising:

a current supply increasing unit configured to operate the switching element to increase a current supply to the switching element;

an estimation unit configured to estimate a detection temperature of the temperature detection unit when the current supply to the switching element is increased by the current supply increasing unit under an assumption that temperature detection unit is operating normally;

a range calculation unit configured to calculate an acceptable range of the estimate of the detection temperature defined by an upper limit side threshold higher than the estimated detection temperature by a first predefined value and a lower limit side threshold lower than the estimated detection temperature by a second predefined value;

a diagnostic unit configured to, when it is determined that the detection temperature of the temperature detection unit is out of the acceptable range of the estimate of the detection temperature at a time the detection temperature is estimated by the estimation unit, determine that an abnormality is present in the temperature detection unit; and a permission unit configured to permit the current supply increasing unit to increase the current supply only when a braking torque is being applied to the vehicle by a braking unit.

2. The apparatus of claim 1, wherein the estimation unit is configured to estimate the detection temperature of the temperature detection unit when the current supply converges after the current supply is increased by the current supply increasing unit.

3. The apparatus of claim 1, wherein
the estimation unit is configured to estimate the detection temperature of the temperature detection unit every predetermined time interval when the current supply is increased by the current supply increasing unit and thereby increases.

4. The apparatus of claim 3, wherein
the diagnostic unit is configured to use at least two estimates of the detection temperature of the temperature detection unit calculated by the estimation unit to determine the presence of an abnormality in the temperature detection unit.

5. The apparatus of claim 1, wherein
the estimation unit is configured to estimate the detection temperature of the temperature detection unit when the current supply is increased by the current supply increasing unit and thereby increases toward a convergence value at a predefined rate of increase of temperature.

6. The apparatus of claim 1, wherein
the estimation unit is configured to estimate the detection temperature of the temperature detection unit when the current supply is increased by the current supply increasing unit and thereby increases toward a convergence value according to one of a moving average operation, a low-pass filtering operation and a smoothing operation.

7. The apparatus of claim 1, wherein
the permission unit is configured to permit the current supply increasing unit to increase the current supply when it is determined that the vehicle is stationary.

8. The apparatus of claim 7, wherein
the braking unit comprises a user braking section configured to increase the braking torque with an increasing actuation amount of a brake pedal by a user of the vehicle, and
the permission unit is configured to permit the current supply increasing unit to increase the current supply when it is determined that the braking torque is being applied to the vehicle by the user braking section of the braking unit.

9. The apparatus of claim 7, wherein
the braking unit comprises a forced braking section configured to apply the braking torque to the vehicle whether or not a brake pedal is actuated by a user and when it is determined that the vehicle is stationary, and
the permission unit is configured to permit the current supply increasing unit to increase the current supply when it is determined that the braking torque is being applied to the vehicle by the forced braking section of the braking unit.

10. The apparatus of claim 7, wherein
the permission unit is configured to permit the current supply increasing unit to increase the current supply during a time period from when vehicle control is directed to activate by a user operating a direction switch to when the vehicle starts moving.

11. The apparatus of claim 7, wherein
the permission unit is configured to permit the current supply increasing unit to increase the current supply after vehicle control is directed to terminate by a user operating an direction switch.

12. The apparatus of claim 1, wherein
the braking unit comprises a user braking section configured to increase the braking torque with an increasing actuation amount of a brake pedal by a user of the vehicle, and a regenerative braking section configured to control a braking torque applied by the braking unit such that a vehicle demanded braking torque can be achieved as a sum of the braking torque applied by the braking unit and a regenerative braking torque generated through conversion of vehicle kinetic energy into electrical energy in the main rotating machine, and
the permission unit is configured to permit the current supply increasing unit to increase the current supply during a time period in which the braking torque is being applied to the vehicle by both of the user braking section and the regenerative braking section.

13. The apparatus of claim 1, wherein
the estimation unit is configured to correct the estimate of the detection temperature to decrease with a higher temperature of the switching element before the current supply is increased by the current supply increasing unit.

14. The apparatus of claim 1, wherein
the estimation unit is configured to correct the estimate of the detection temperature to decrease with a higher temperature of a member that is positively correlated in temperature with the switching element before the current supply is increased by the current supply increasing unit.

15. The apparatus of claim 1, wherein
the estimation unit is configured to correct the estimate of the detection temperature to increase with a larger amount of current supply increase by the current supply increasing unit.

16. An apparatus for diagnosing a temperature detection unit, mounted in a vehicle provided with a power conversion circuit including a switching element, a control unit configured to operate the switching element to control a torque of a main rotating machine electrically connected to the power conversion circuit to a demanded torque, the temperature detection unit being configured to detect a temperature of the switching element, the apparatus comprising:
a current supply increasing unit configured to operate the switching element to increase a current supply to the switching element;
an estimation unit configured to estimate a detection temperature of the temperature detection unit when the current supply to the switching element is increased by the current supply increasing unit under an assumption that the temperature detection unit is operating normally;
a range calculation unit configured to calculate an acceptable range of the estimate of the detection temperature defined by an upper limit side threshold higher than the estimated detection temperature by a first predefined value and a lower limit side threshold lower than the estimated detection temperature by a second predefined value;
a diagnostic unit configured to, when it is determined that the detection temperature of the temperature detection unit is out of the acceptable range of the estimate of the detection temperature at a time the detection temperature is estimated by the estimation unit, determine that an abnormality is present in the temperature detection unit; and
a direction unit configured to direct the current supply increasing unit to steer a d-axis current in the fixed coordinate system of the rotating machine such that the increasing of the current supply to the switching element by the current supply increasing unit does not result in a changing of the demanded torque.

17. The apparatus of claim 16, wherein
the main rotating machine is a permanent magnet synchronous motor, and the direction unit is configured to direct the current supply increasing unit to increase the d-axis current in a direction in which the magnetic flux of the main rotating machine decreases.

18. The apparatus of claim 17, wherein
the current supply increasing unit is configured to increase the current supply toward a maximum current supply that is required to set the demanded torque to its acceptable upper limit.

* * * * *